(12) United States Patent
Giampaolo

(10) Patent No.: US 7,930,508 B2
(45) Date of Patent: Apr. 19, 2011

(54) FILE SYSTEMS FOR DATA PROCESSING SYSTEMS

(75) Inventor: Dominic Giampaolo, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 516 days.

(21) Appl. No.: 11/370,333

(22) Filed: Mar. 7, 2006

(65) Prior Publication Data

US 2007/0226443 A1 Sep. 27, 2007

(51) Int. Cl.
*G06F 12/00* (2006.01)
(52) U.S. Cl. ......... 711/170; 711/112; 711/165; 707/823
(58) Field of Classification Search .................. None
See application file for complete search history.

(56) References Cited

U.S. PATENT DOCUMENTS

| | | | | |
|---|---|---|---|---|
| 5,758,334 | A * | 5/1998 | Knight et al. | 707/2 |
| 6,353,837 | B1 * | 3/2002 | Blumenau | 707/205 |
| 6,742,080 | B1 * | 5/2004 | Grimsrud et al. | 711/112 |
| 2003/0093401 | A1 * | 5/2003 | Czajkowski et al. | 707/1 |
| 2004/0101281 | A1 * | 5/2004 | Defrance et al. | 386/69 |
| 2004/0193819 | A1 * | 9/2004 | Marinescu et al. | 711/165 |

OTHER PUBLICATIONS

Giampaolo, Dominic, "Practical File System Design With the Be File System", San Francisco, CA: Morgan Kaufammann Publishers. pp. 7-32, 45-64.
"Fast System Startup for PCs Running Windows XP", Windows Platform Design Notes, Jan. 31, 2002, 27 pages.
Stuart Sechrest et al., "Windows XP Performance", Microsoft Windows XP Operating System, Jun. 2001, 24 pages.
Mark Russinovich et al., "Windows XP: Kernel Improvements Create a More Robust, Powerful, and Scalable OS", MSDN Magazine, Dec. 2001, 26 pages.

* cited by examiner

*Primary Examiner* — Brian R Peugh
*Assistant Examiner* — Alan Otto
(74) *Attorney, Agent, or Firm* — Blakely, Sokoloff, Taylor & Zafman LLP

(57) ABSTRACT

A method for dynamically optimizing file systems based on user access patterns or other parameters. According to an embodiment of the present invention, a list of files forming a cluster is first created based on various preset criteria by an application, the list is transmitted to a file system program, and then the file system optimizes allocation of files in a storage medium based on the list. Embodiments of the present invention can be used to rearrange files stored in a storage medium so that files which tend to be used together are stored closer to each other. This can substantially reduce a typical application launch time.

21 Claims, 23 Drawing Sheets

260

| F5 | 12.5 |
|---|---|
| F14 | 18.3 |
| F19 | 42.8 |
| F21 | 28.8 |
| F22 | 29.6 |
| F27 | 21.7 |
| F28 | 20.9 |

FILE SYSTEMS FOR DATA PROCESSING SYSTEMS

BACKGROUND OF THE INVENTION

1. Field of the Invention

The present invention generally relates to data processing systems. More particularly, the present invention pertains to a file system of a computer operating system.

2. Description of the Related Art

A typical data processing system comprises a central processing unit, memory, and various peripheral devices such as mass storage units. A user's data is usually stored in long-term non-volatile mass storage devices such as hard disks using magnetic or optical media. One of the main purposes of many data processing systems such as personal computers is to create, manipulate, store, and retrieve data. An operating system, or a file system in particular, provides the machinery to support these tasks. File systems of modern computers, such as HFS or HFS+ of Apple Macintosh® operating system, are integral parts of all operating systems and provide a way to organize, store, retrieve, describe, and manage information on a permanent or semi-permanent storage medium.

The unit of storage in modern block devices such as a hard disk is a so-called block. For example, storage areas of modern hard disks are typically divided into tracks and sectors, which form blocks, or physical blocks. A physical block is an area in the storage medium that can be read and saved as a unit, and it provides the smallest unit that can be manipulated by the storage device. The typical block size of many modern hard disks is 512 bytes.

Many file systems also manage data on block storage media using blocks, or logical blocks. A logical block is often mapped to one or more physical blocks on a hard disk and it is the same size as, or integer multiples of, the disk block size. Data of a file is generally stored in one or more logical blocks. File systems also store data about a file, or its metadata, in one or more logical blocks. For example, many file system implementations use special or regular blocks on a storage media to store files' metadata. In most modern file systems, a data structure generally called an inode is used to store a file's metadata. For instance, a file's creation time, last access time, and permission settings, and the like, are typically stored in the inode associated with the file. An inode often occupies one logical block, but it can occupy two or more blocks if the inode grows beyond one logical block size.

It is a well-recognized fact in the art that accessing devices like hard disks is orders of magnitude slower than other operations in typical data processing systems. For example, central processing units typically found in personal computers have a clock frequency of 1 GHz or higher, translating into more than one instruction being performed per each few nanoseconds, whereas typical seek times of data stored in hard disks is of the order of 10 milliseconds. The bandwidth of the internal bus, for example, associated with the system memory, is of the order of hundreds of megabytes to gigabytes per second, or often much higher, whereas the typical value of the bandwidth of IDE or SCSI hard drives is around 20~50 megabytes per second. The primary reason for this discrepancy in speed is that hard disks have mechanical parts. That is, to access data, the disk needs to be spun, and the heads need to be moved to access the target blocks. The seek time to move the disk heads from one part of a disk to another is considerable. Any operation that requires mechanical movement is usually much slower than those that require only electrical switching.

For this reason, accessing data that requires less amount of mechanical motion in a hard disk provides much faster access and much higher bandwidth. For example, reading or writing contiguous blocks from a disk is much faster than having to seek to access different blocks spread over different areas of the disk. Likewise, accessing blocks from the same cylinder group is substantially faster than otherwise because reading successive blocks in a cylinder group only involves switching heads. Switching disk heads is an electrical operation and thus significantly faster than a mechanical operation such as moving the heads.

Modern hard disks hide much of their physical geometries and their internal operations, and much of the low-level optimization is done at the drive controller level. File systems rely on the drive controllers for many tasks. In many file systems, the block storage device is abstracted into an array of (logical) blocks. File systems then manage the block array, and the device controllers do the actual working including mapping of the logical blocks into the corresponding physical blocks. In this disclosure, we will often use this level of abstraction for the sake of clarity. However, as will be apparent to people of ordinary skill in the art, the present invention can be understood, and practiced, at many different levels.

As an illustration, a schematic drawing of a logical structure of a storage medium such as a hard disk or a compact disc (CD) is shown in FIG. 1A. The medium 102 is divided into multiple blocks, which are not explicitly shown in the figure. Each block in this example can be viewed either as a logical allocation block or as a set of contiguous such blocks, possibly representing a file or a directory content or metadata. Certain regions of the medium in the figure are marked with hashed rectangles, 104-112. These rectangular regions represent blocks storing files or directories, or their metadata, i.e. inodes. The figure shows five such regions labeled from A to E.

In order to illustrate the file access times and their dependence on the file arrangement on the storage medium, two exemplary file access scenarios are shown in FIGS. 1B and 1C. In this example, it is assumed, for the purposes of illustration, that the file access or seek time is simply proportional to the sum of the distance between the locations in the block array of any consecutively accessed files. In the scenario of FIG. 1B, files are accessed "sequentially" based on the arrangement of the files on the medium. Their total access or seek time equals to 10.0, in an arbitrary unit.

FIG. 1C shows another exemplary access pattern and the corresponding seek times. Note that the files are accessed in a more or less random order in this scenario. More specifically, the access order is A, E, B, D, and C. The total seek time in this scenario is 32.0, much larger than 10.0 in the case of FIG. 1B. This example illustrated in FIG. 1 hence demonstrates the effects of file and directory access patterns, and their arrangement in a storage medium, to the access or seek times of the needed data.

In the prior art, files and directories are stored without regard to this consideration. As an example, FIG. 2 show typical mappings between a file or directory hierarchy and the corresponding file arrangement in a storage medium, or in a logical block array. The top portion of FIG. 2A illustrates an exemplary directory structure in a hierarchical file system, such as HFS of the Apple Macintosh® operating system. The tree 132 in the figure has nine nodes, labeled A through I. Four of them, A, B, C, and F, represent directories, whereas the rest leaf nodes represent files. The drawing at the bottom of the figure illustrates a logical representation of the block array 134 in a file system for the nodes in tree 132. The files and directories shown in the file tree are arranged in a particular order in this block array. For simplicity, we assume that they are inode blocks of the corresponding files and directories and that each inode occupies one block 136. The array also shows a region of empty blocks 138. The particular ordering shown in the figure is based on depth-first arrangement, and it is not in any way optimized in the sense illustrated with regards to FIG. 1. Note that the particular arrangement shown in FIG. 2A might be viewed as an example after installation of a new operating system on a new computer or the installation of new software (e.g. a new Web browser) on an existing, already used computers.

Once the system is used, however, the file arrangement changes on the storage medium. For example, some existing files and directories may be deleted and some new files and directories may be added. Furthermore, certain files and directories may be moved to different locations. FIG. 2B shows an exemplary directory structure, based on that of FIG. 2A, after some time of use. As is apparent from this pair of figures, FIGS. 2A and 2B, certain files have been deleted and some new files have been added during this intervening time period. More specifically, directories D and F and files H and I, from the tree 132 of FIG. 2A, have been deleted, and new directories J and K and new files L and M have been added. The new tree structure 162 reflects these changes. The bottom drawing in FIG. 2B illustrates a logical representation of this new block array 164 which reflects the way the data is stored on a physical medium. The updated list of files and directories from the file hierarchy 162 is shown in this block array representation, with the same labels. Note that, in this case, the occupied blocks 166 are fragmented and spread over the empty block regions 168. Therefore, at least for the reasons given with respect to FIG. 1, a typical access or seek time in FIG. 2B will usually be much larger than that of the block array shown in FIG. 2A for a typical file access pattern. This often translates into slower application launch, and longer response time in terms of user interaction. Degradation of performance after some time of use is typical in the implementations of the prior art. It should be noted that file data or file metadata may not be physically removed when the corresponding file is deleted from the file hierarchy. In some implementations of file systems, "deleted" files and directories may remain on the storage medium and may be made simply inaccessible.

There has been much effort to reduce file access times from block storage media. There are, for example, prior art applications that "defragment" file allocations in the storage medium, which are widely available in some of the popular platforms such as the NTFS file system of Microsoft Windows operating system. However, they are limited to defragmenting file contents stored in multiple regions: That is, defragmentation in the prior art attempts to gather the blocks storing the content of a single file to a contiguous single region.

In some cases, file contents are cached or pre-loaded into memory to speed up the application launch. However, this type of implementation does not directly address the issue of block arrangement in storage media and its effect on the application or file access times.

BRIEF SUMMARY OF THE DESCRIPTION

The present invention provides a system for optimizing a file system performance. A file system manages mass storage devices and, in particular, it stores, organizes, describes, and retrieves data or information stored in storage media of the mass storage devices such as hard disk drives. Much of disk access time is spent in seeking blocks storing the data or the metadata of files or directories in file systems. The present invention relates to a method and an apparatus for optimizing file systems by rearranging file data or metadata in block storage media.

In an embodiment of the present invention, an application or utility program and the file system of an operating system collaborate with each other to optimize the file allocations in storage media, for example, in order to reduce the average file access times. First, the application analyzes file access patterns based on various criteria, and it creates a request to the file system. Then the file system optimizes allocation of files and directories in the storage media based on the request.

According to one aspect of an embodiment of the present invention, an application program creates a list of files based on the user access patterns of files and directories and/or based on other parameters. Each file list may be generated based on the proximity of the files to each other in terms of various attributes associated with files and directories such as last file access times, and it provides information regarding a group of files that form a cluster. The term cluster is used in this context to indicate a group of loosely related files which are likely to be accessed or used together in a given time window. In some embodiments, a user or utility software may define clusters of files based on some additional information. Once one or more such file lists are constructed, they are transmitted to the file system program. In one embodiment, these cluster lists are transmitted one at a time. In another embodiment, these lists are first collected, by going through the whole file hierarchy, and a set of lists is transmitted at the end of each traversal.

According to embodiments of the present invention, the file system optimizes allocation of files in a storage medium based on the transmitted list or set of lists. In some embodiments, this is done by allocating files from the same cluster in the nearby physical region in a storage medium.

At least one embodiment of the present invention utilizes virtual inode tables. A virtual inode table maintains a mapping between inodes and the blocks storing the corresponding inodes in an indirect way. This allows the file system to rearrange physical inode blocks without affecting application programs which rely on the constancy of the inode-block mapping.

Embodiments of the present invention can be used to rearrange files stored in a storage medium so that files which tend to be used together are physically stored closer to each other. This can substantially reduce the average time for accessing related group of files, for example, during the initial launch of an application.

BRIEF DESCRIPTION OF THE DRAWINGS

The novel features of the present invention are set forth in the appended claims. The invention itself, however, as well as various exemplary modes of use, and advantages thereof, will best be understood by reference to the following detailed description of illustrative embodiments when read in conjunction with the accompanying drawings, wherein:

FIG. 14A shows an exemplary directory structure.

FIG. 14B shows an exemplary dentry, corresponding to the directory "/bar", in one particular arrangement of blocks in a file system.

FIG. 14C shows a dentry of the same directory as in FIG. 14B in a different arrangement of blocks.

DETAILED DESCRIPTION

The present invention will now be described more fully hereinafter with reference to the accompanying drawings, in which various exemplary embodiments of the invention are shown. In the following description, for purposes of explanation, numerous specific details are set forth in order to provide a thorough understanding of the present invention. It will be evident, however, to one skilled in the art that the present invention may be practiced without these specific details. Like numbers refer to like elements throughout.

At least certain embodiments of the present invention provide a system for dynamically optimizing a file system performance. A file system manages mass storage devices and, in particular, it stores, organizes, describes, and retrieves data or information stored in storage media of the mass storage devices such as hard disk drives on behalf of other applications or system processes. It has been recognized that much of disk access time is spent in seeking blocks storing the data or the metadata of files or directories in file systems. Embodiments of the present invention relate to a method and an apparatus for optimizing file systems by rearranging file data or metadata in block storage media in order to reduce the seek times of files and directories. In the following discussion, the word "file" will be often used to denote both files and directories unless otherwise indicated. In some current file systems, directories are files. In some other file system implementations, directories might have different internal representations than those of files.

Figure 1A:
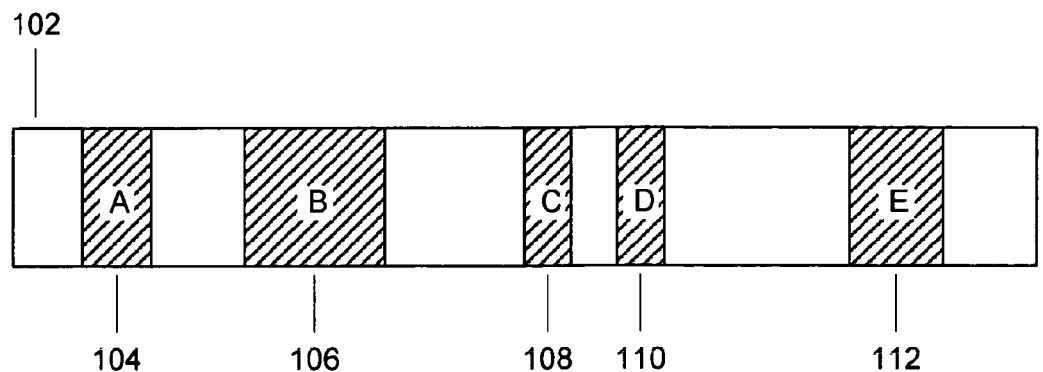
FIG. 1A is a schematic drawing of a logical structure of storage medium such as a hard disk. The medium is divided into multiple rectangular blocks.
Figure 1B:
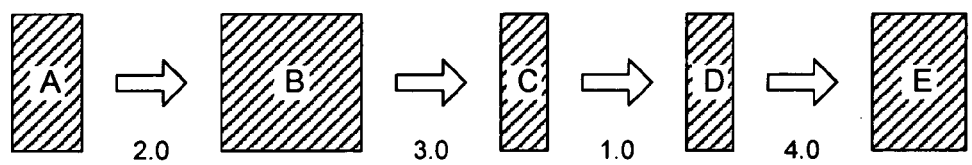
FIG. 1B shows an exemplary pattern for accessing some of these blocks in a particular sequence and its access or seek times.
Figure 1C:
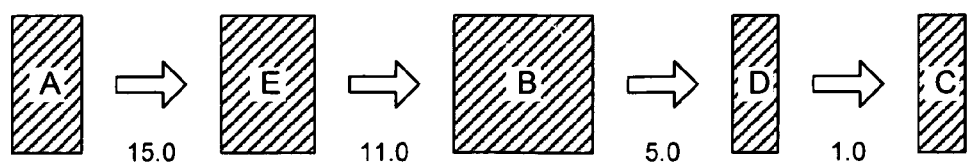
FIG. 1C shows another exemplary access pattern and the corresponding seek times.
Figure 2A:
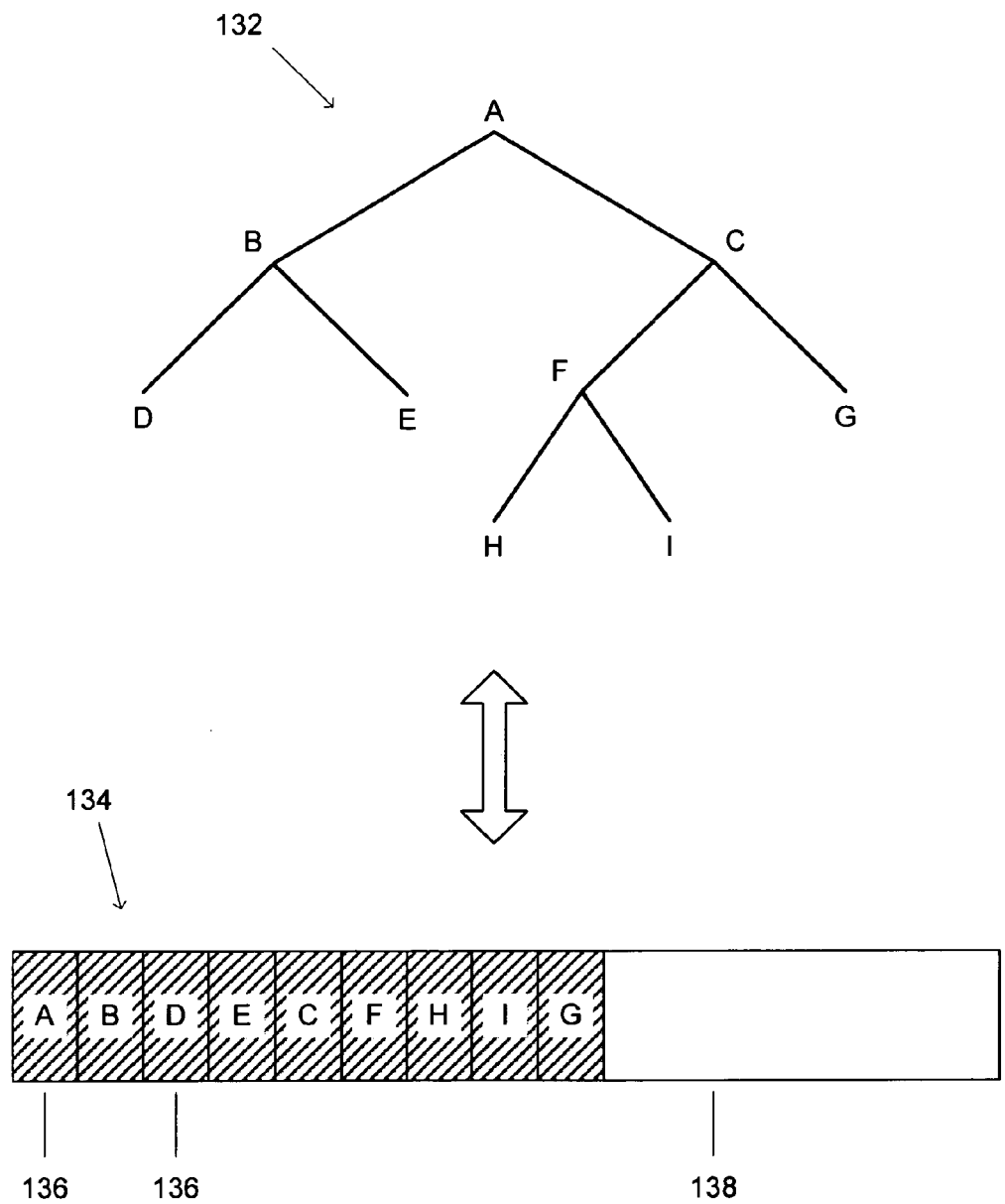
FIG. 2A illustrates a typical directory structure in a hierarchical file system, as a tree, at the top of the figure. The drawing at the bottom of the figure illustrates a logical representation of the block array in a file system.
Figure 2B:
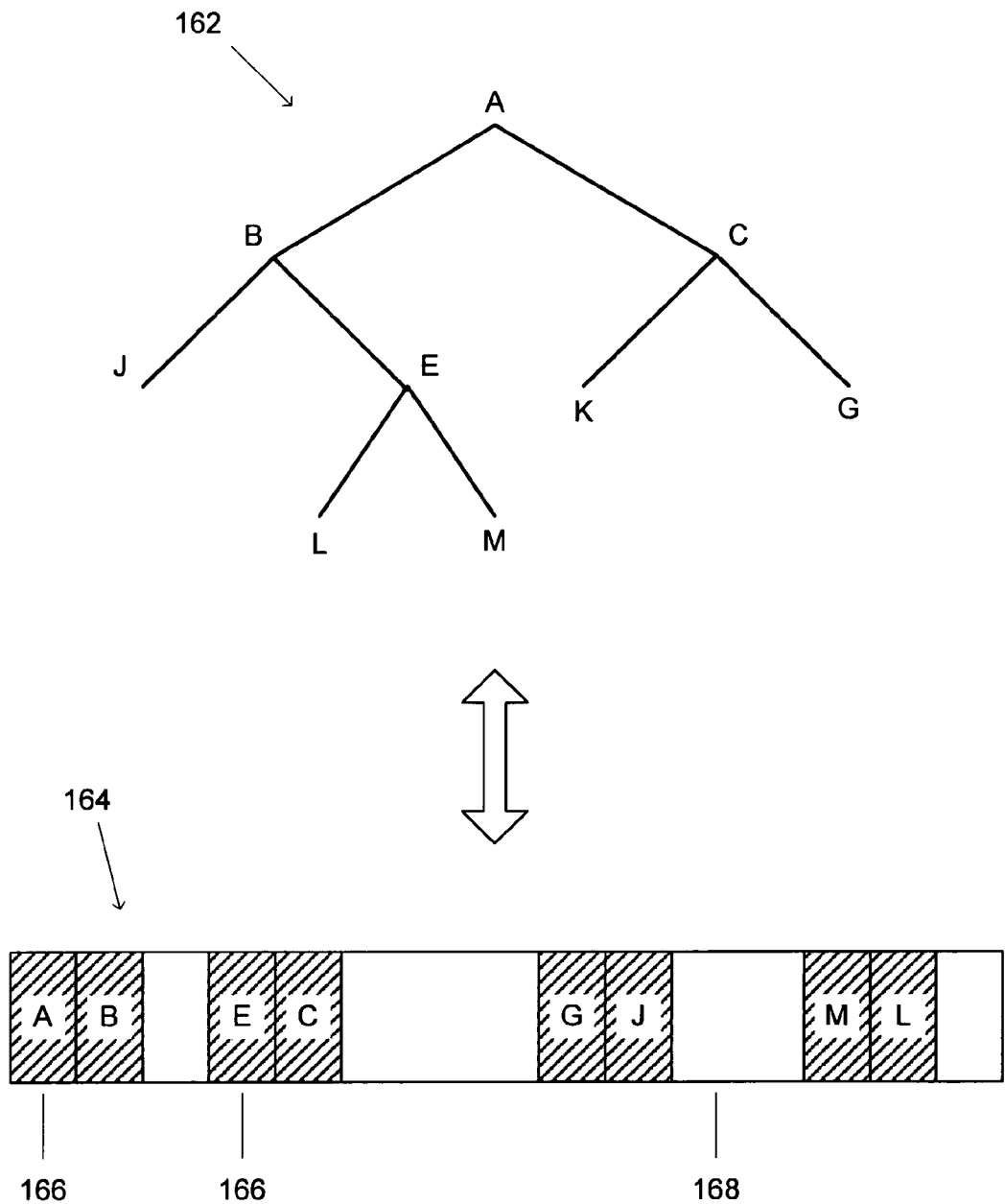
FIG. 2B shows an exemplary directory structure of FIG. 2A after some time of use. The bottom drawing in the figure illustrates a logical representation of this new block array. The physical blocks in the storage medium may have a similar spatial representation.
Figure 3A:
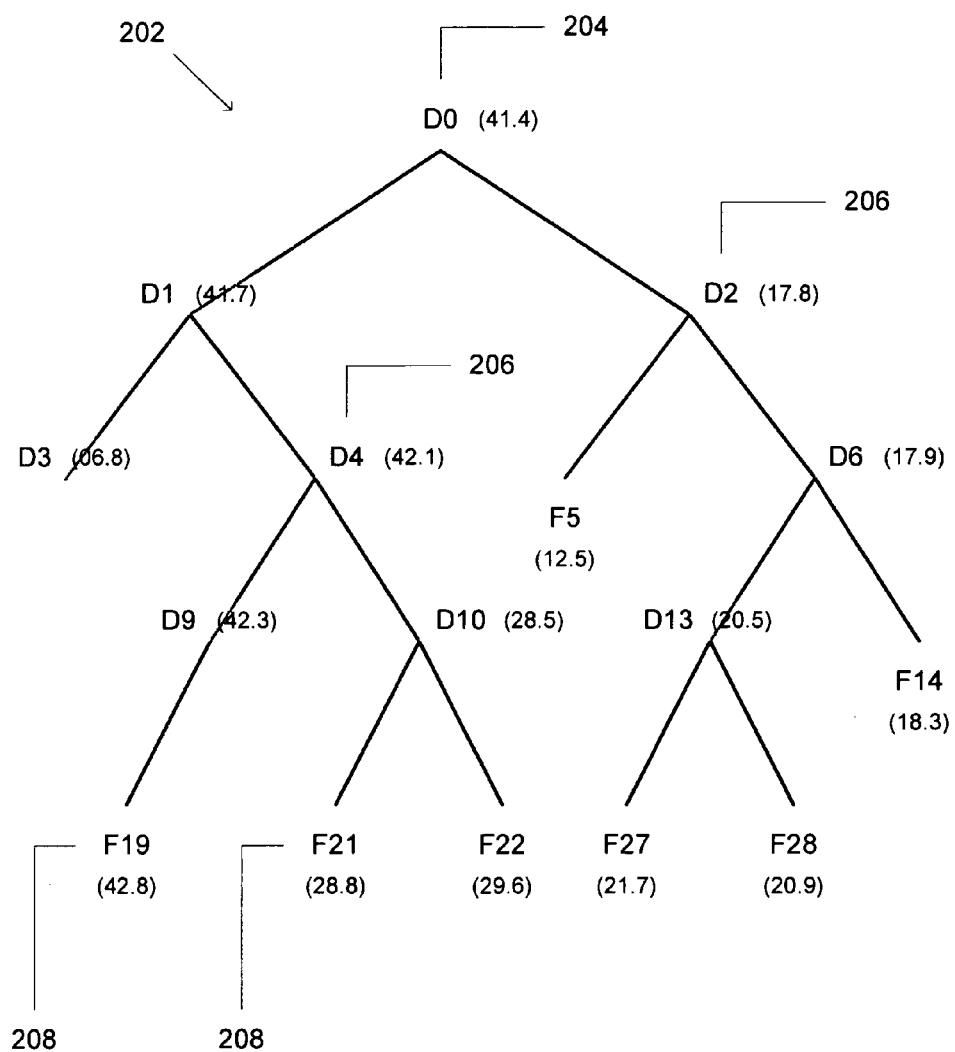
FIG. 3A depicts an exemplary directory structure. Each leaf node represents a file, whereas inner nodes are for directories. Each node in the figure is shown with a timestamp representing the last access time.

FIG. 3A depicts an exemplary directory structure 202 in a hierarchical file system. Each leaf node 208 represents a file, whereas inner nodes 206 are for directories. The exemplary tree of this figure contains seven files labeled with prefix "F" and nine directories with prefix "D". A typical hierarchical file system always has one special node, that is, the root node 204, which is often associated with the root directory of the file system. In traditional Unix file systems, the file system is initialized, during the boot process, by mounting the main volume of a bootable block device into the root node, i.e., "/". Each node in the figure is shown with a timestamp representing the last access time. The time is measured from an arbitrary point in time. For example, the file F22 was last accessed at time 29.6, 0.8 second after the file F21 had been accessed (29.6−28.8=0.8).

Figure 3B:
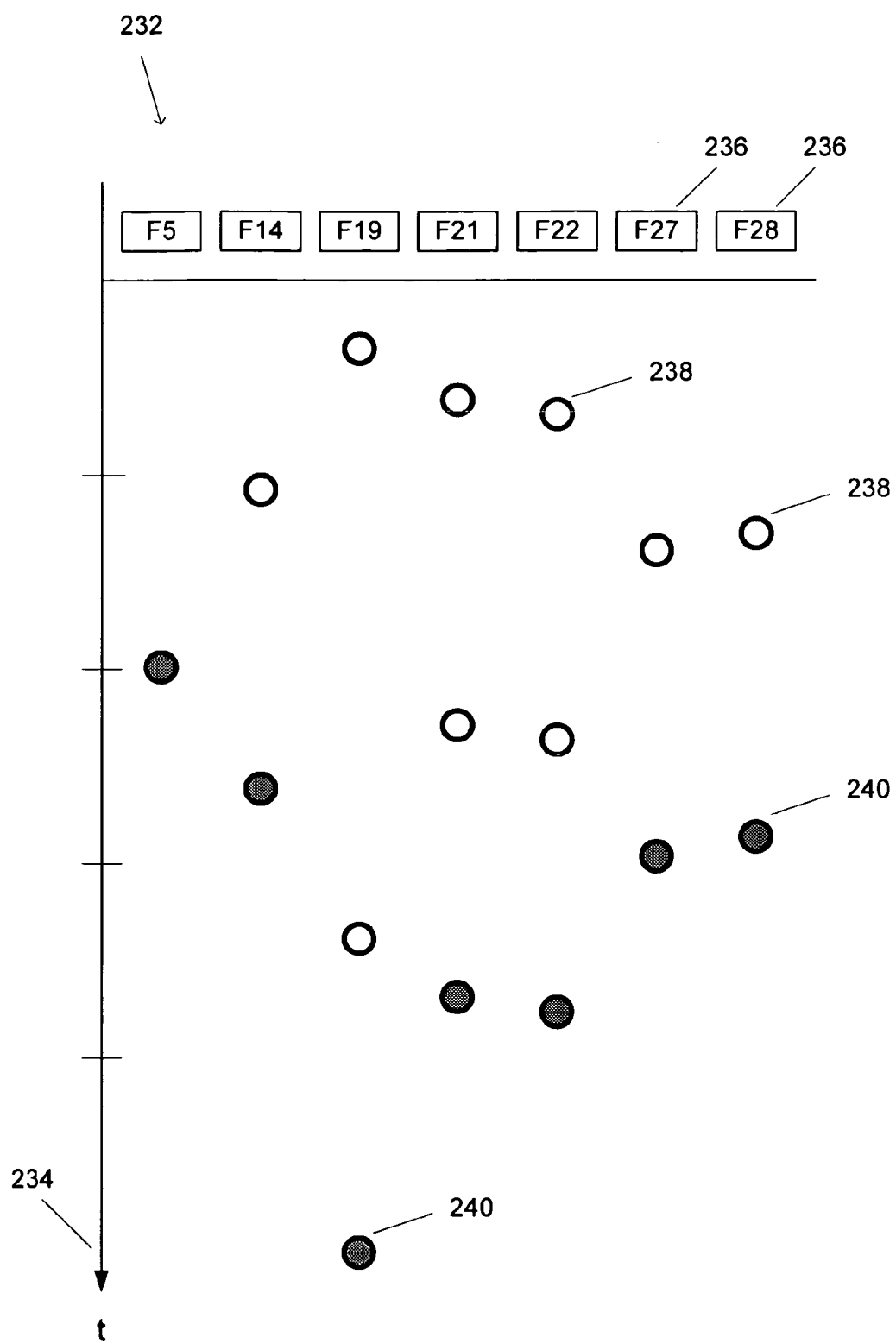
FIG. 3B illustrates an access pattern for the files and directories in the example shown in FIG. 3A. Time axis is drawn vertically, from top to bottom. Each circle indicates that the corresponding file or directory is accessed at that particular time.

FIG. 3B shows an exemplary file access pattern 232. Time axis 234 is drawn vertically, from top to bottom. The table shows only the files 236 from the exemplary directory tree of FIG. 3A. Each circle, 238 and 240, indicates that the corresponding file, or directory, is accessed at that particular time. The last, i.e. the bottommost, circle 240 in each column corresponds to the last, or the most recent, access of the file. Note that this pattern is consistent with the last file access times shown in FIG. 3A.

As can be easily recognized from the figure, certain files are typically accessed together. For example, files F27 and F28, and files F21 and F22, are accessed within a short time window as indicated in the figure. This may be due to the fact that these files are associated with the same applications. In this oversimplified example, the files F21 and F22, and the files F27 and F28, happen to be closely related in the file hierarchy as shown in FIG. 3A. However, this may not be the case in general. The last access times for these seven files are tabulated in FIG. 3C. Note that these last access times summarized in the table 260 correspond to the numbers shown in parentheses in FIG. 3A and to the filled circles in the diagram of FIG. 3B.

Figures 3C, 3D:
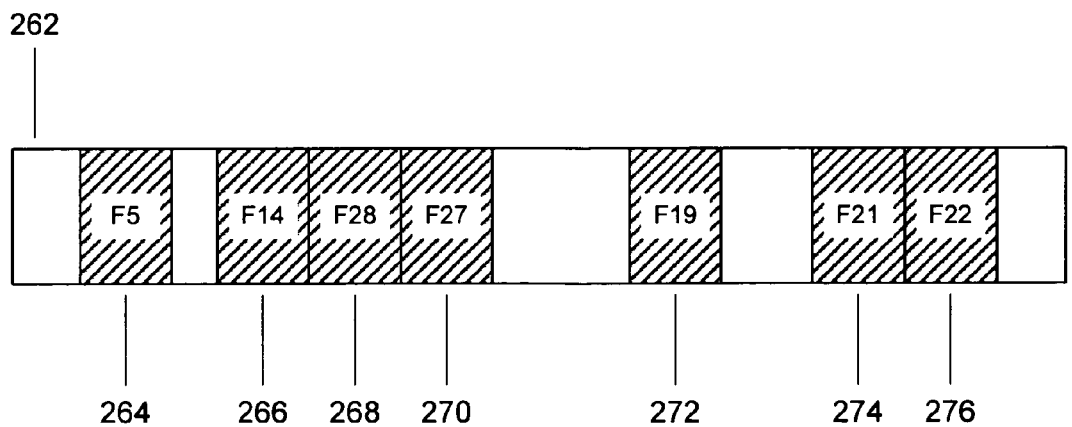
FIG. 3C summarizes the last access times for the seven files from the example of FIG. 3A. Note that these last access times correspond to the filled circles in the diagram of FIG. 3B.
FIG. 3D illustrates a block array representation of the directory and file structure of FIG. 3A, according to an exemplary embodiment of the present invention.

In embodiments of the present invention, the file system is optimized by rearranging file data or metadata, or both, in block storage media such that it reduces the seek times of files and directories in a typical case of file access. According to an embodiment of the present invention, an application or utility program and the file system of an operating system collaborate with each other to optimize the file allocations in storage media. First, the application analyzes file access patterns based on various criteria, and it creates a request to the file system. Then the file system optimizes the storage media based on the request. A block array representation 262 of an exemplary file arrangement according to an embodiment of the present invention is shown in FIG. 3D. The blocks representing the files, 264 through 276, are marked with hashed rectangles in the figure. In this example, files have been arranged such that the total seek time is minimal, or near-minimal, for a particular access pattern, namely, F5, F14, F28, F27, F19, F21, and then F22. The assumption is that the files will be typically accessed in a way closely resembling the previous access patterns, for example, as shown in FIGS. 3A through 3C.

Figure 4A:
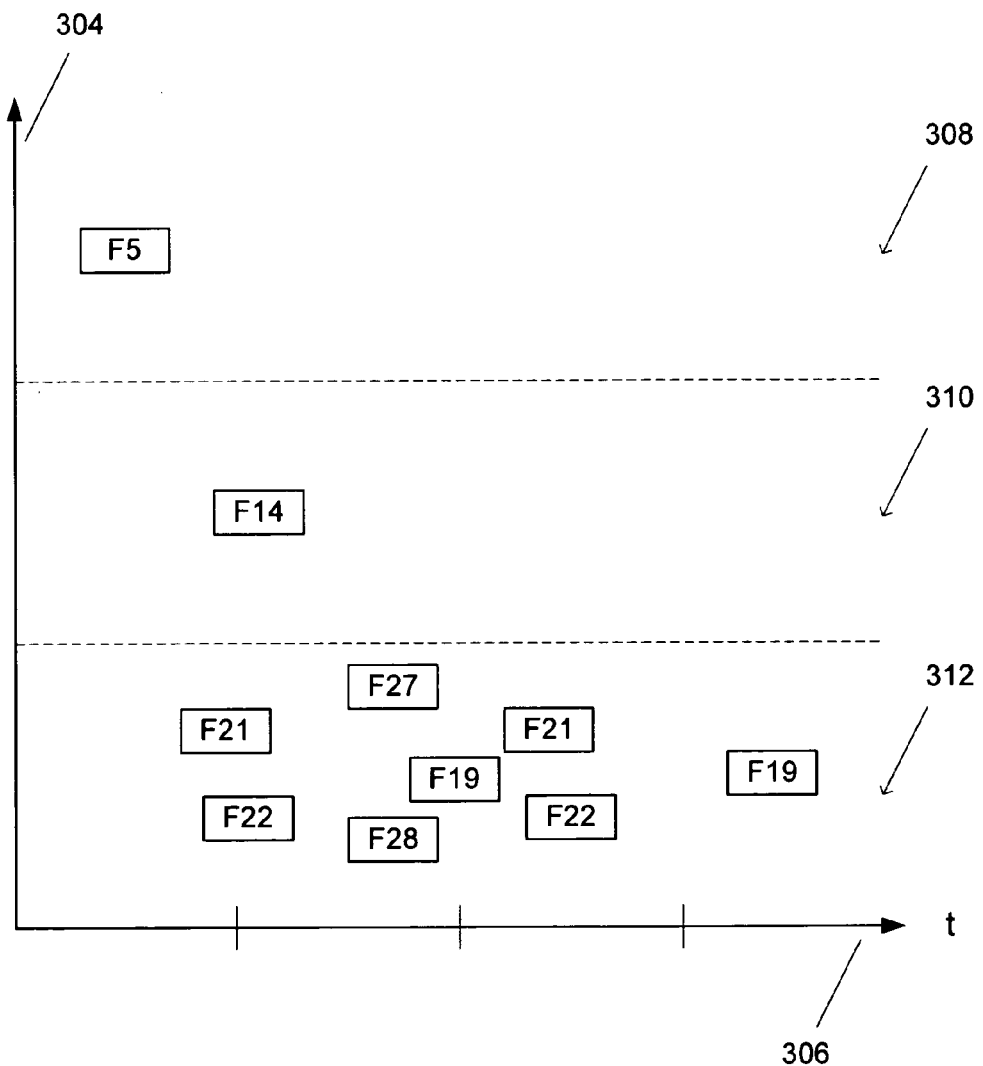
FIG. 4A shows an exemplary pattern for accessing files and directories in two-dimensional diagram. Time axis is drawn horizontally, increasing from left to right. The vertical axis represents a depth or level of each file or directory in a hierarchical directory structure.

File attributes other than last access times can also be used for this purpose. For example, FIG. 4A shows a typical pattern for accessing files and directories in a two-dimensional attribute diagram. The last file access time 306 is drawn horizontally, with time increasing from left to right. The vertical axis 304, on the other hand, represents a depth or level of each file or directory in a hierarchical directory structure. The diagram shows three levels, 308, 310, and 312 corresponding to different levels of a tree shown in FIG. 3A. The small rectangular boxes indicate file access at specified times. Files can be clustered based on these two or any other additional attributes.

Figure 4B:
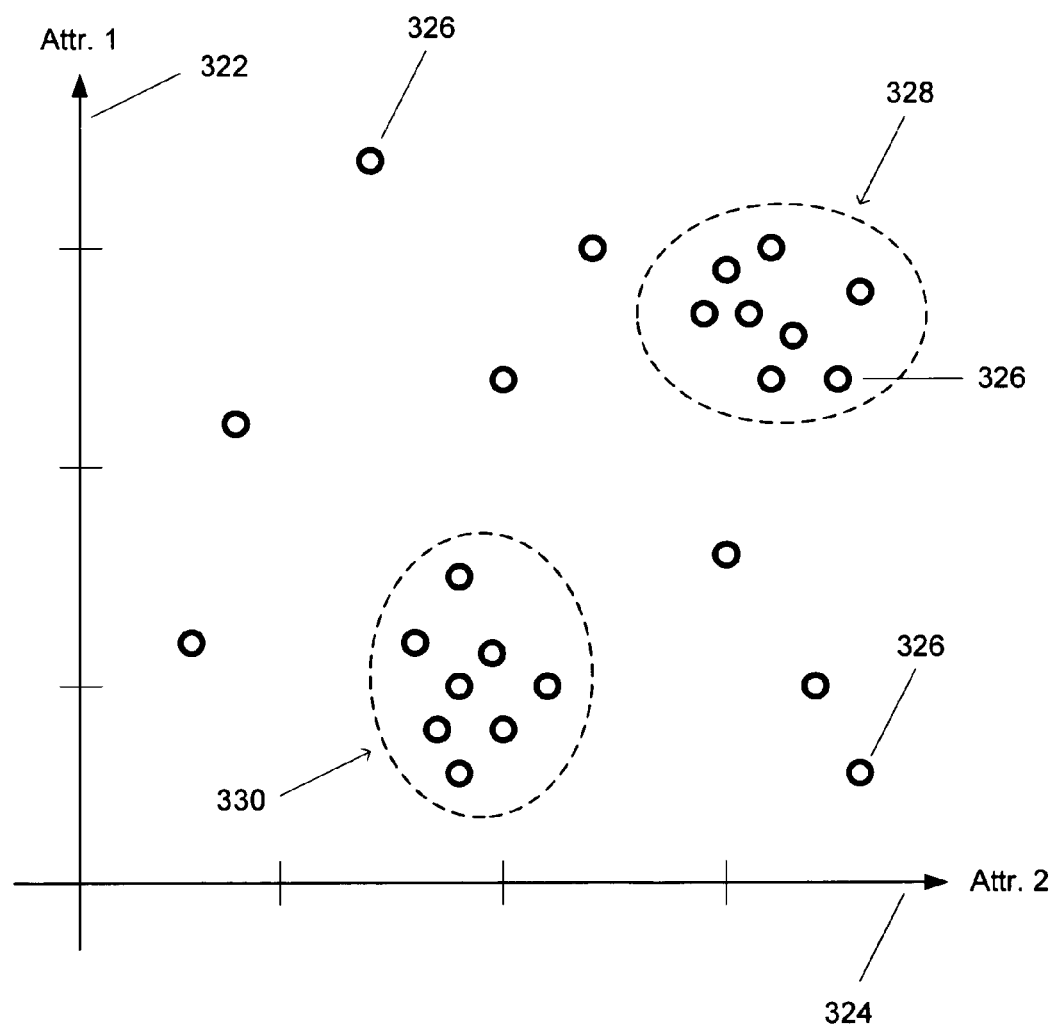
FIG. 4B is a schematic drawing of distribution of files in two-dimensional attribute space. As illustrated in the figure, files are clustered into multiple groups.

In general, any attribute associated with files and directories can be used for clustering purposes. According to an embodiment of the present invention, relevant attributes are first selected based on various criteria. Then each file and directory is "plotted", either explicitly or implicitly, on this attribute space. FIG. 4B shows a schematic drawing of distribution of files in a two-dimensional attribute space, comprising "Attr. 1" 322 and "Attr. 2" 324. These attributes are assumed to have real values in this example. Some attributes, however, may take only discrete values. Each circular dot 326 in the figure represents a file or directory in the file system. As illustrated in the figure, the distribution of the files is typically non-uniform, and files are more or less clustered into groups. In particular, the exemplary distribution of FIG. 4B includes two rather clearly defined clusters, 328 and 330, which are marked with broken lines. Embodiments of the present invention use this distribution and clusters for optimizing files systems. The grouping, or clustering or files, can be done using various clustering algorithms known in the related art. For example, K-means or Hierarchical clustering algorithms may be used.

Figure 5:
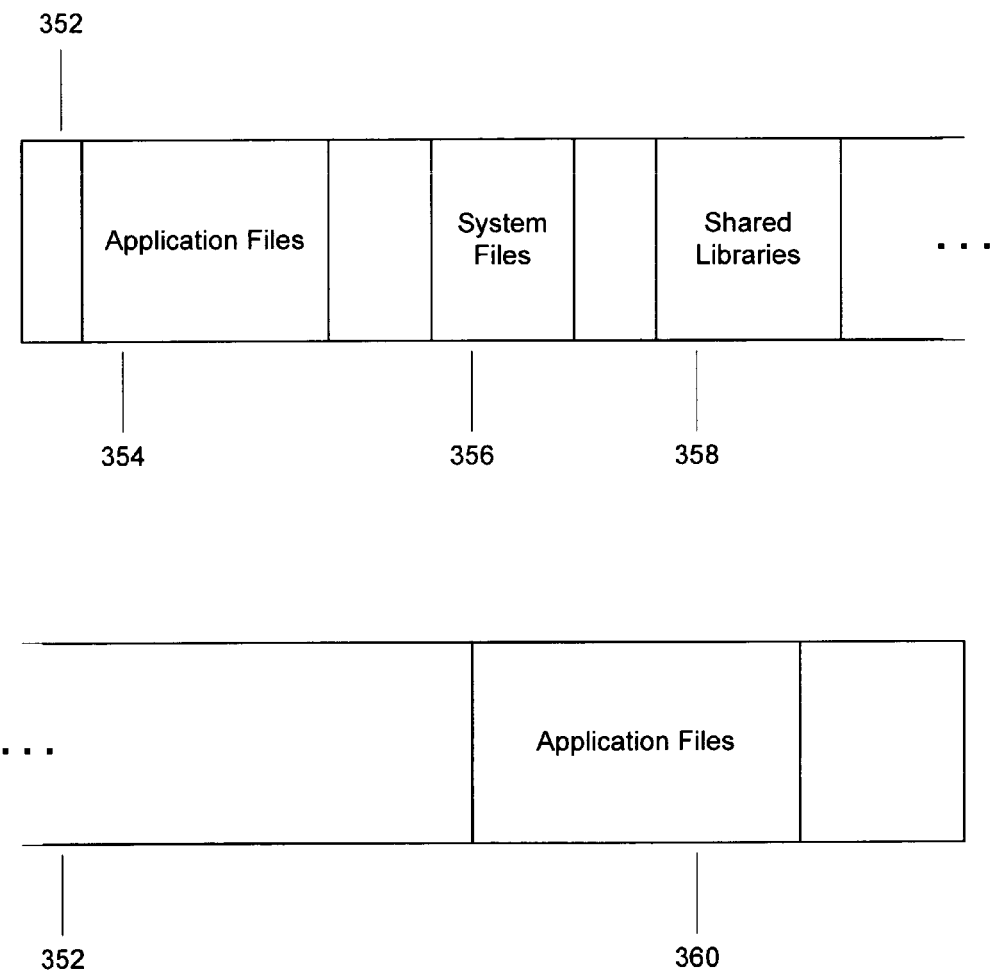
FIG. 5 illustrates an exemplary block array arrangement in one embodiment of the present invention. In this embodiment, the storage medium is logically divided into multiple regions.

According to at least one embodiment of the present invention, the clustering request is processed by the file system. In some embodiments, files belonging to the same cluster in a request are rearranged in a block array so that they are stored together in a nearby physical region of the storage device. In some other embodiments, the file system may implement more complicated algorithms. For example, the file system may maintain additional attributes or classes of files and directories, and files are reallocated within predetermined constraints. One such example is shown in FIG. 5. The exemplary block array 352 shown in the figure is divided into multiple regions. In particular, it shows four distinct regions, 354-360. Each region is used to store a particular group of files which meet certain preset criteria. For instance, the block array 352 in this example shows four such regions corresponding to applications, shared libraries, and system files. Note that the application group is distributed over multiple regions, 354 and 360, in this illustration.

Figure 6:
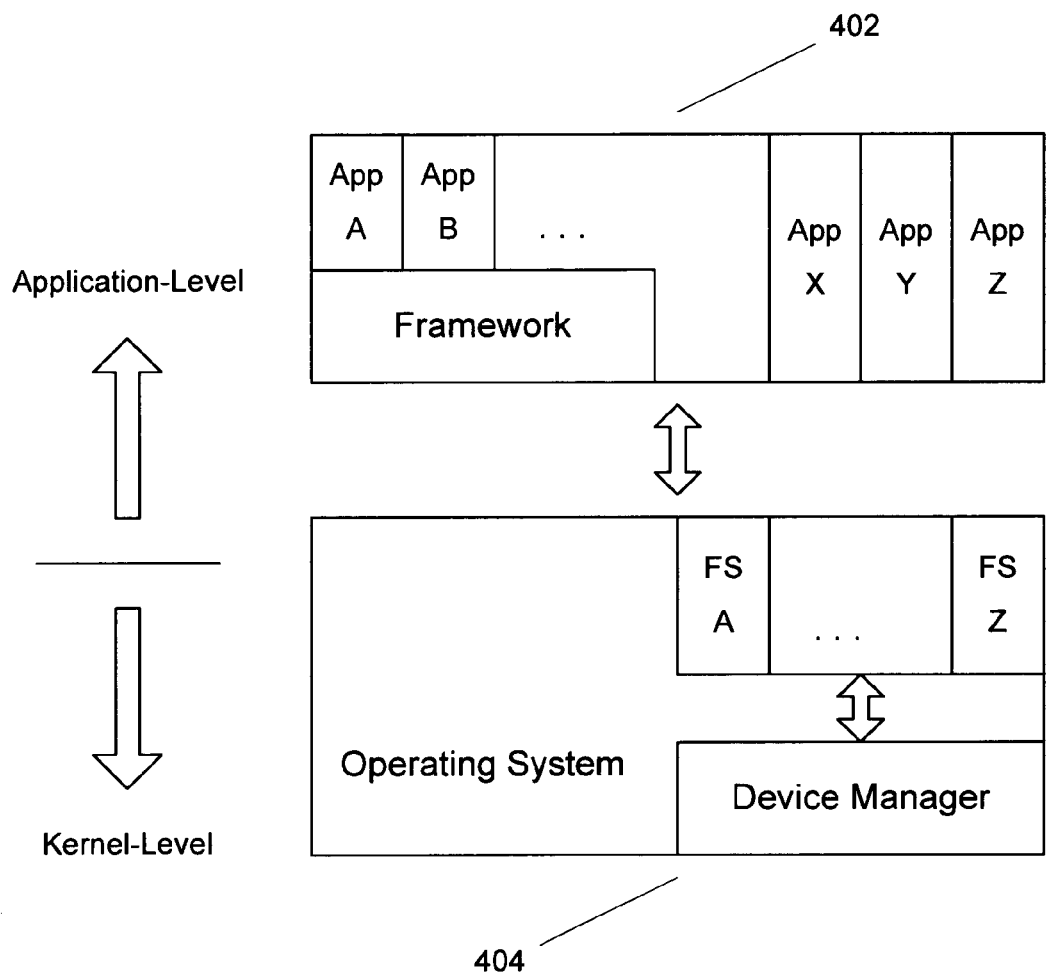
FIG. 6 shows a high-level relationship among software programs running on typical data processing systems such as Apple Macintosh® personal computers.

With respect to FIG. 6, the block diagram shows a high-level relationship among various software programs or components running on typical data processing systems such as Apple Macintosh® personal computers. The diagram shows two distinct components, an operating system 404 and other application programs 402. An operating system 404 may comprise more than one file systems, as indicated by multiple "FS" blocks in the figure. In some operating systems, additional abstraction layer may be used to manage diverse file systems, which is commonly called a virtual file system in the related art. In many computer systems, the software programs are categorized into two groups: Kernel level and application level. Operating systems tend to comprise both types of programs, whereas non-operating system programs typically run only at the application level. Much of the functionalities of many file systems are implemented at the kernel level, as shown in the diagram, because they require special privileges to access protected resources in the system. The framework included at the application level, in component 402, includes various common libraries and shared files that can be utilized by applications. Common GUI controls, for example, are a part of the framework in this illustration. Note that this example is for illustrative purposes only and should not be taken literally. For example, some framework functionalities might be implemented at the kernel level.

In an embodiment of the present invention, one software component, typically an application or utility program, either from 402 or from 404 of FIG. 6, and another software component, typically a file system of an operating system, from 404, collaborate with each other to optimize the file allocations in storage media, for example, in order to reduce the average file access times. According to one aspect of an embodiment of the present invention, the first software component creates a list of files based on the user access patterns of files and directories and/or based on other parameters. Each file list is generated, for example, based on clustering in the space of selected attributes, as in FIG. 4B. In some embodiments, the "clustering" is done in an ad-hoc way, for instance, based on user input or on other predetermined settings. Once one or more such file lists are constructed, they are transmitted to the second software component. In one embodiment, these cluster lists are transmitted one at a time. In another embodiment, one or more such lists are transmitted together at appropriate times. According to an embodiment of the present invention, the second software component that manages, either directly or indirectly, a block storage medium, such as the file system, optimizes allocation of files in the storage medium based on the transmitted list or set of lists. In some embodiments, this is done by rearranging, or clustering, files from the same list or cluster in a nearby region in the storage medium, for example, as illustrated in FIG. 3D. It should be noted that the term clustering is used in both contexts in this disclosure, as is common in the related art. That is, clustering sometimes refers to grouping of files, in a logical sense, based on certain attributes associated with the files, and it, in other times, refers to reallocating blocks so that related files and directories are stored in nearby physical regions in a block storage medium. The appropriate meaning, however, should be clear to skilled artisans in the related art based on the context.

Figure 7:
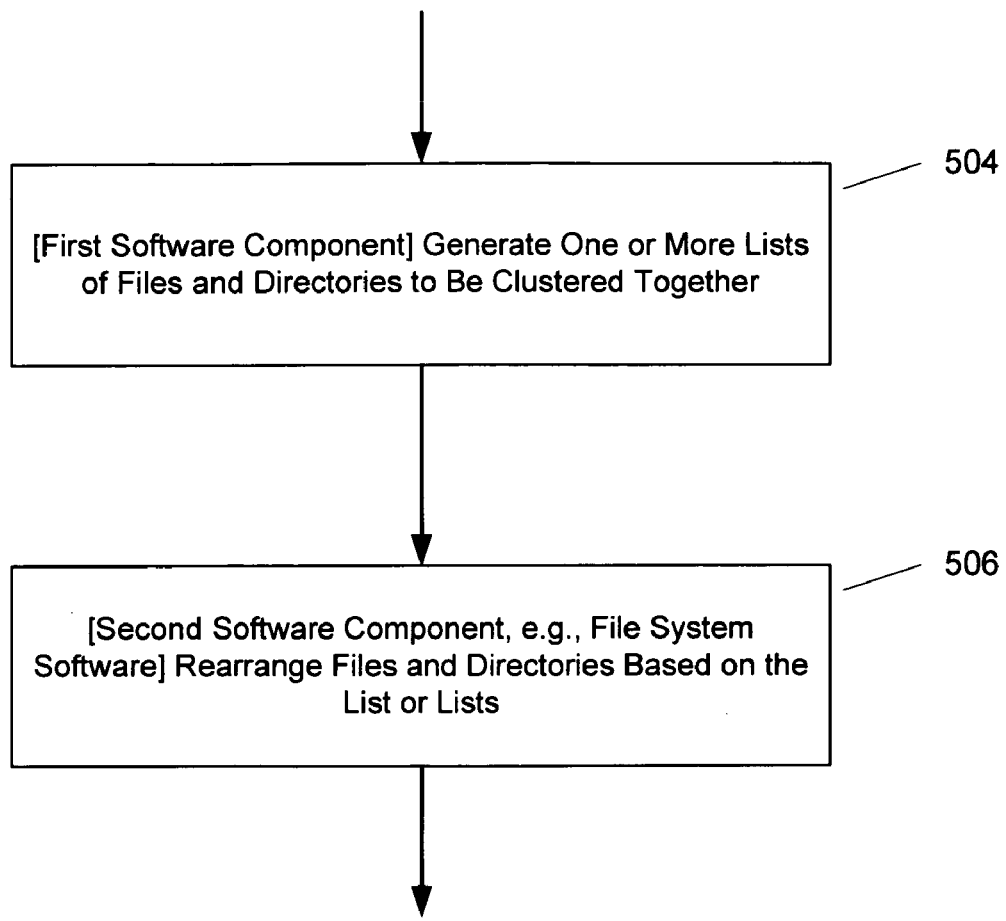
FIG. 7 is a high-level flow chart illustrating two main components or operations in an exemplary embodiment of the present invention.

Turning now to FIG. 7, an exemplary embodiment of the present invention is illustrated as a flow chart. As shown in the chart, the embodiment involves the aforementioned two software components, indicated simply as first and second components in the figure, and it comprises the following two main operational elements: (1) Generating a list of files to be clustered by the first software component, as shown in block 504, based on some preset clustering algorithm, and (2) relocating, or clustering, files and directories in a block storage medium by the second software component, as indicated in block 506, based on the request by the first software component. In some embodiments, the request is considered a suggestion or hint, and the second software component may or may not fully oblige to the request by the first component. As alluded earlier, the first software component is an application or utility program implemented either as a stand-alone program or as a part of the operating system in some embodiments. The role of the second software component is typically assumed by a file system software of the operating system. However, some or all of the functionalities discussed in the context of the second software component may be implemented by other types of softwares. For example, a device driver for a block device can be used for this purpose. Or, its entire implementation may be made to run in the block device itself in some embodiments, for example, as a firmware. It should be noted that the present invention might be embodied as a single software component. Or, it can be embodied with more than two components. Reference to the two software components throughout the discussion of various embodiments in the following description should not be construed as limitations of embodiments of the present invention.

Figure 8A:
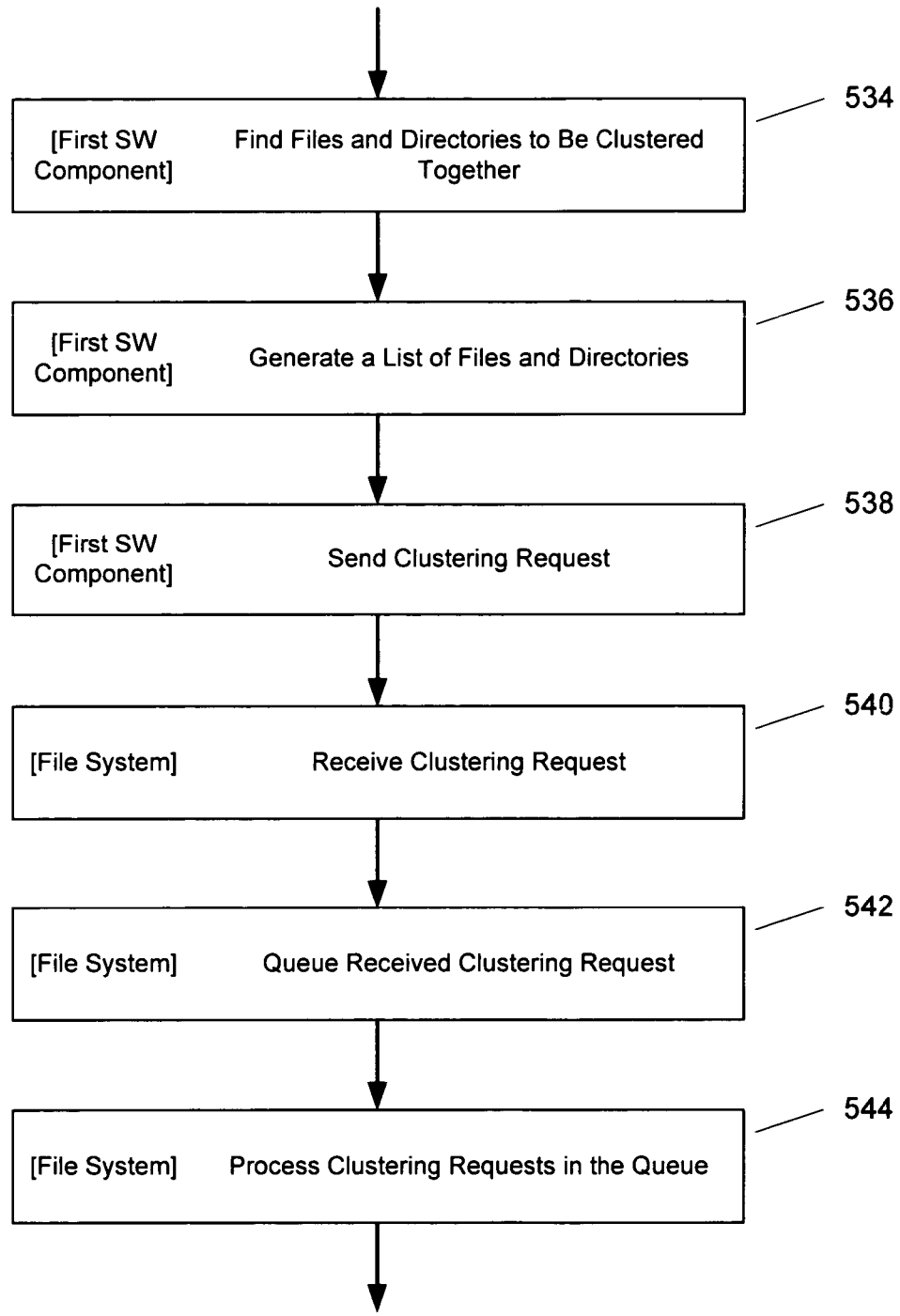
FIG. 8A shows a flow chart illustrating an embodiment of the present invention. This embodiment also comprises two operational or functional units, as in FIG. 7.

FIG. 8A is a flow chart illustrating another embodiment of the present invention. This embodiment also comprises two components or functional units, as in FIG. 7. In this embodiment, the first component, e.g. an application program, generates a list of files or directories to be clustered together based on preset rules and/or using clustering algorithms in a space of relevant attributes, as shown in blocks 534 and 536. Then, the list is sent to the second component, a file system of the operating system in this embodiment, at 538. The file system typically queues the incoming requests, as indicated in blocks 540 and 542, and processes them at appropriate times based on predetermined policies, at 544.

Figure 8B:
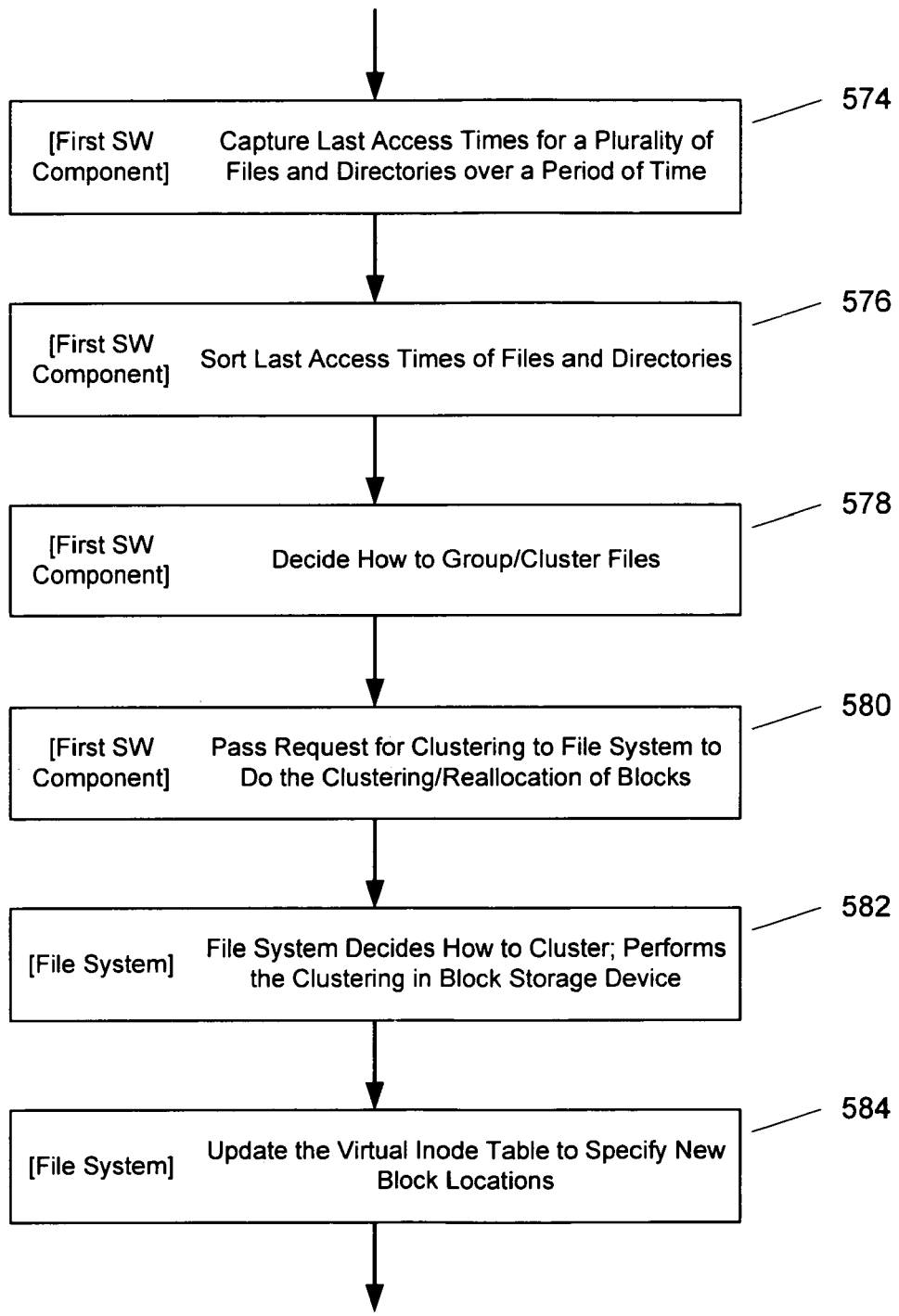
FIG. 8B shows another flow chart illustrating an embodiment similar to the one shown in FIG. 8A. Note that this embodiment creates clustering requests based on file access times.

FIG. 8B shows another flow chart illustrating an embodiment similar to the one shown FIG. 8A. In particular, this flow chart describes an exemplary embodiment that creates the file cluster lists based on last access times of files and directories. First, the first software component, e.g. a utility program which is a part of software of the operating system of a data processing system, gathers information regarding last file access times in a preset time window, as shown in block 574. The last file access time is typically managed by a file system and available to other programs. In particular, all POSIX-compliant file systems, such as HFS or HFS+ of Apple Macintosh® operating system, maintain this information, for example, in inodes associated with the files or directories, and expose this information to other programs through well-defined application programming interfaces (APIs). Next, the files and directories are sorted based on the last access times and possibly other additional attributes, at block 576. An example has been given with respect FIGS. 3 and 4. A file cluster list is then generated based on preset criteria or algorithms, at 578, and a clustering request comprising this list is sent to the second software component, i.e. the file system in this exemplary embodiment, as indicated in block 580.

Once the file system receives the request, it typically queues or otherwise stores the request for later processing, as in the example of FIG. 8A. In some embodiments, the request might be processed as soon as it is received, which is assumed to be the case in this particular embodiment. According to at least one embodiment of the present invention, this processing operation comprises rearranging files and directories in a block storage medium, as indicated in blocks 582 and 584. This will be further discussed later with regards to FIGS. 10 and 12.

Figure 9A:
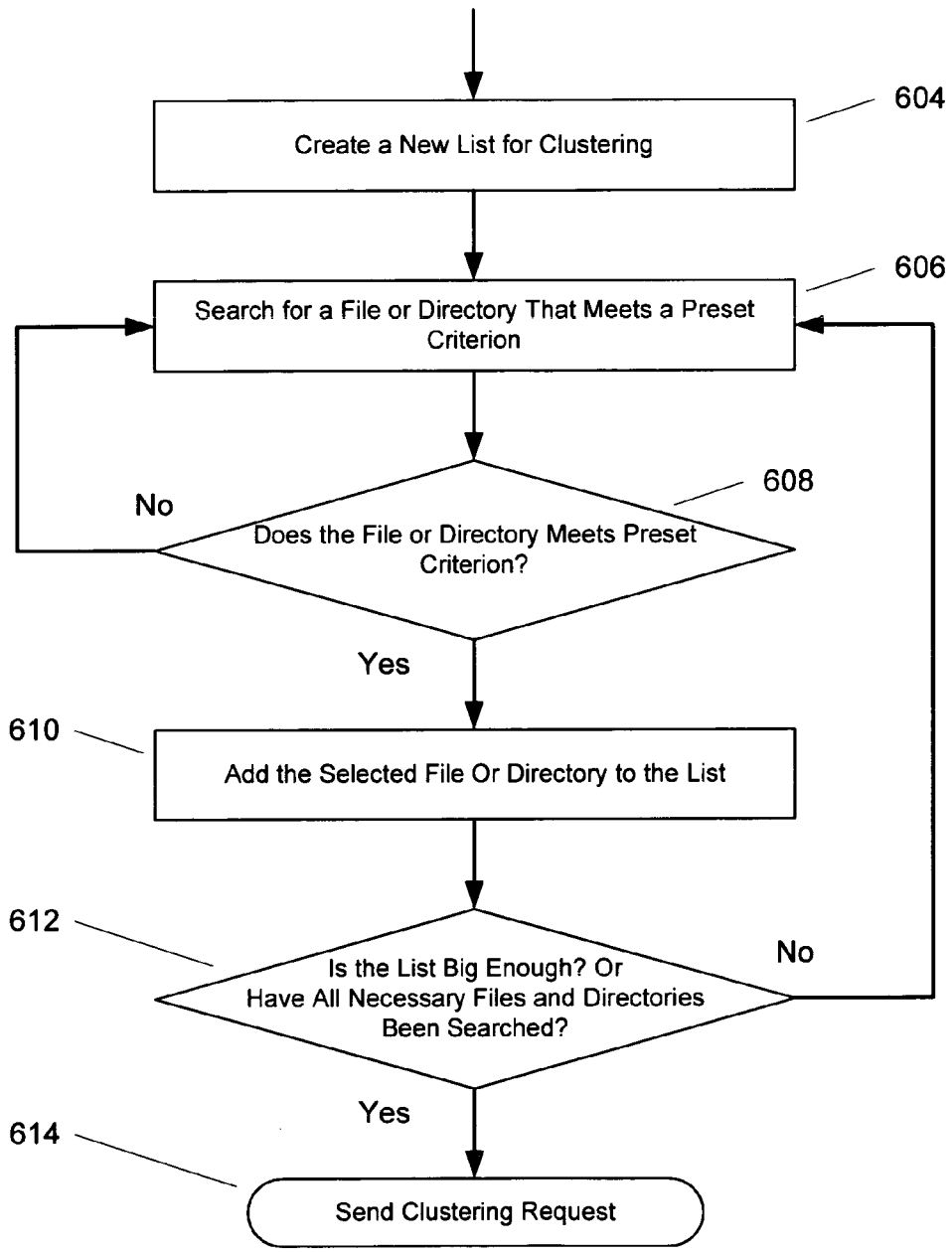
FIG. 9A shows an embodiment of the present invention as implemented in the first software component, e.g. an application or utility program.
Figure 9B:
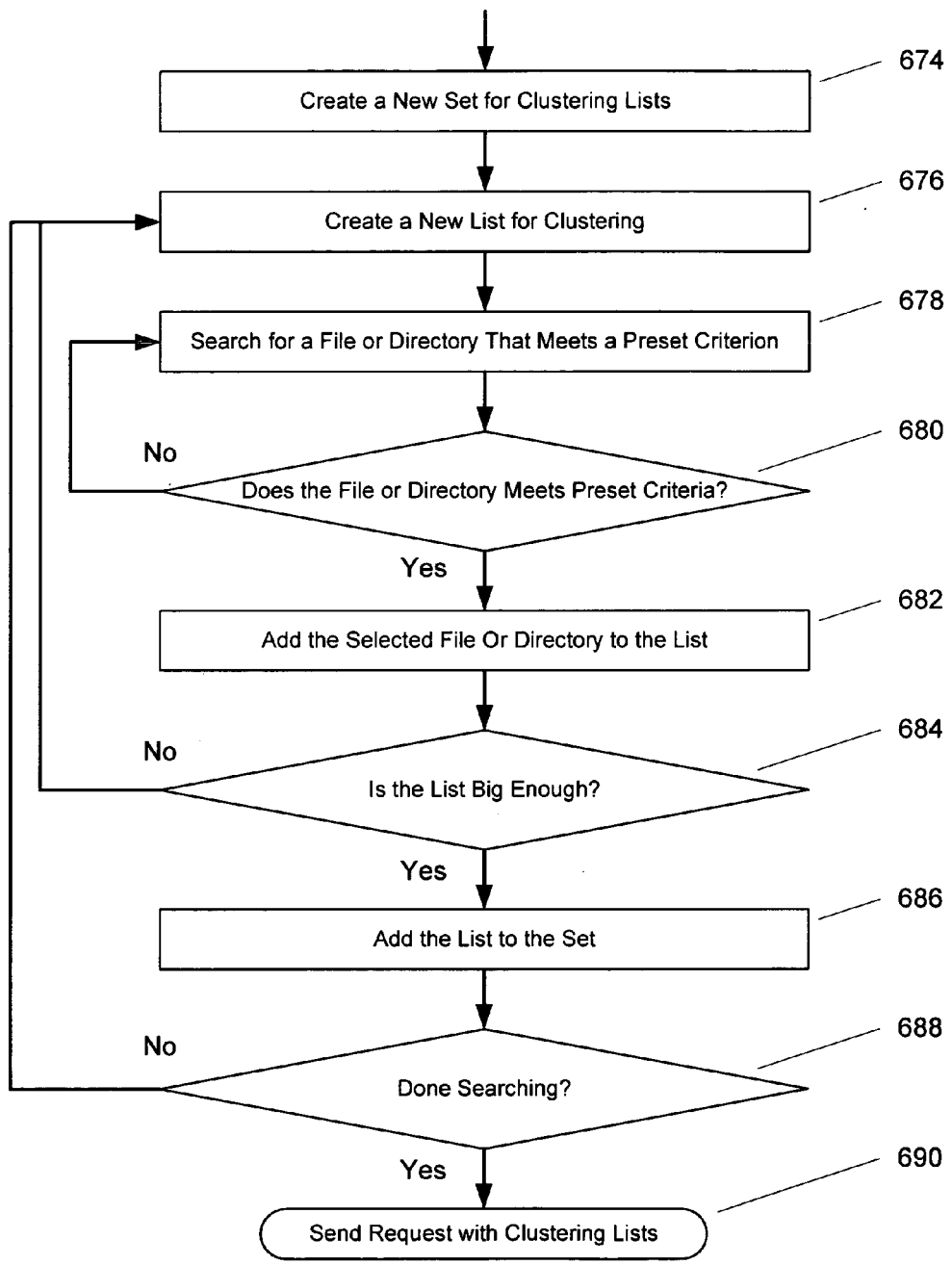
FIG. 9B shows another embodiment of the present invention as implemented in the first software component similar to the one shown in FIG. 9A.

With reference to FIGS. 9A and 9B, exemplary processes of creating clustering requests by the first software component are illustrated in some detail. According to the embodiment shown in FIG. 9A, the first software component, e.g. an application or utility program, goes through all or some subset of the files and directories in a file hierarchy in a particular order, e.g. using a depth-first search in the directory tree, and finds the files and directories that meet a certain preset criterion, as indicated by blocks 606 and 608. When a file or directory that meets the criterion is found, it is included in a list, at 610, which has been created or reset at block 604. Once the number of files and directories in the list reaches a certain preset size, or all files and directories in the file system have been traversed, as indicated by the Yes branch in block 612, a clustering request is constructed based on the current list, and it is then sent to the file system, at 614.

FIG. 9B illustrates another exemplary process of creating clustering requests by a first software component according to an embodiment of the present invention. This embodiment is similar to the one shown in FIG. 9A. One of the main differences is that the embodiment of FIG. 9B generates multiple lists of files for clustering before it sends the request to the file system. This exemplary method starts by creating an empty list of file lists at block 674 and it proceeds with creating file lists for clusters, as indicated as an outermost loop defined by blocks 676 through 688. The loop contains an inner loop, blocks 676 through 684, which comprises an operation 676 for initializing a file list, search operations 678 and 680, and adding selected files and directories to the current file list, 682. Once the size of the current file list reaches a preset value, or if the list otherwise meets certain preset conditions, following the Yes branch at the decision block 684, it is added to the global list initialized at 674, as illustrated in block 686. Otherwise, the process defined by the inner loop continues following the No branch at 684. Finally, once the predefined traversal through the file tree is completed at 688, a new clustering request is created and it is sent to the file system, as indicated by block 690.

Figure 10:
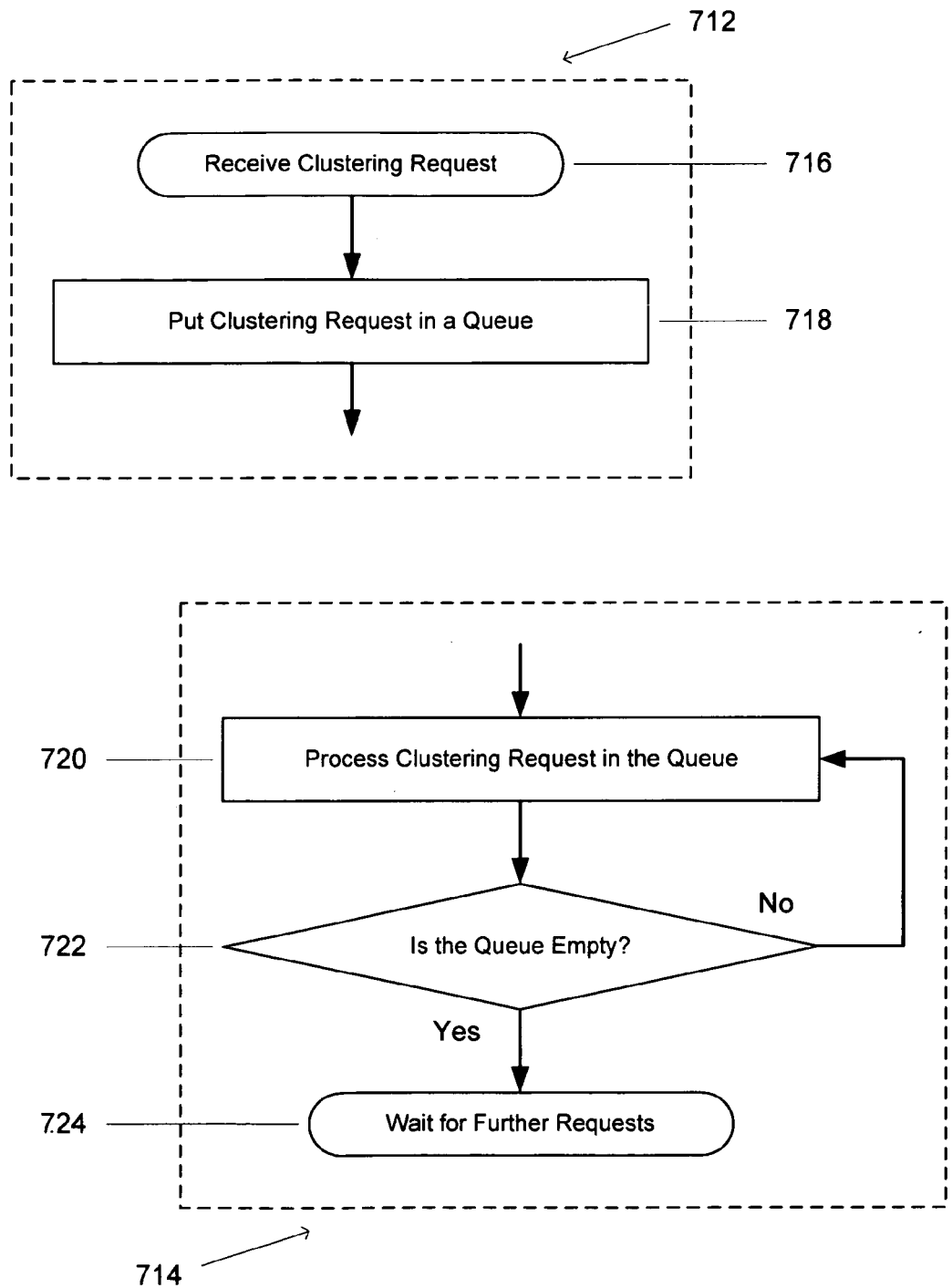
FIG. 10 shows an embodiment of the present invention as implemented as modules in a file system. The embodiments of FIG. 9A or FIG. 9B can be used together with this embodiment.

FIG. 10 shows an embodiment of the present invention as implemented as processes or modules in a file system, or in any software components which, either directly or indirectly, manage block storage devices. The embodiments of FIG. 9A or FIG. 9B, for example, can be used together with this embodiment. As shown in the figure, the flow chart is divided into two parts, 712 and 714. These two parts may or may not work synchronously, or sequentially, in a procedural sense. In some embodiments, these two components may be coupled to each other through events or messages. In other embodiments, these two groups of operations may be implemented by a single module, or by more than two functional units.

The first component 712 comprises two operations in this illustration: Receiving the request from other software components 716 and storing the received requests 718 using a data structure such as a queue. The stored requests are processed later as illustrated in the second block 714, either at a specified time or in response to other events, or based on any preset conditions. The second component 714 includes a loop, blocks 720 and 722, which comprises an operation 720 for processing of one or more clustering requests or one or more file lists contained in any request. If the processing of the currently received requests are done, as indicated by the Yes branch at the decision block 722, this portion of the process terminates and it waits for any additional clustering requests as shown in block 724.

Figure 11:
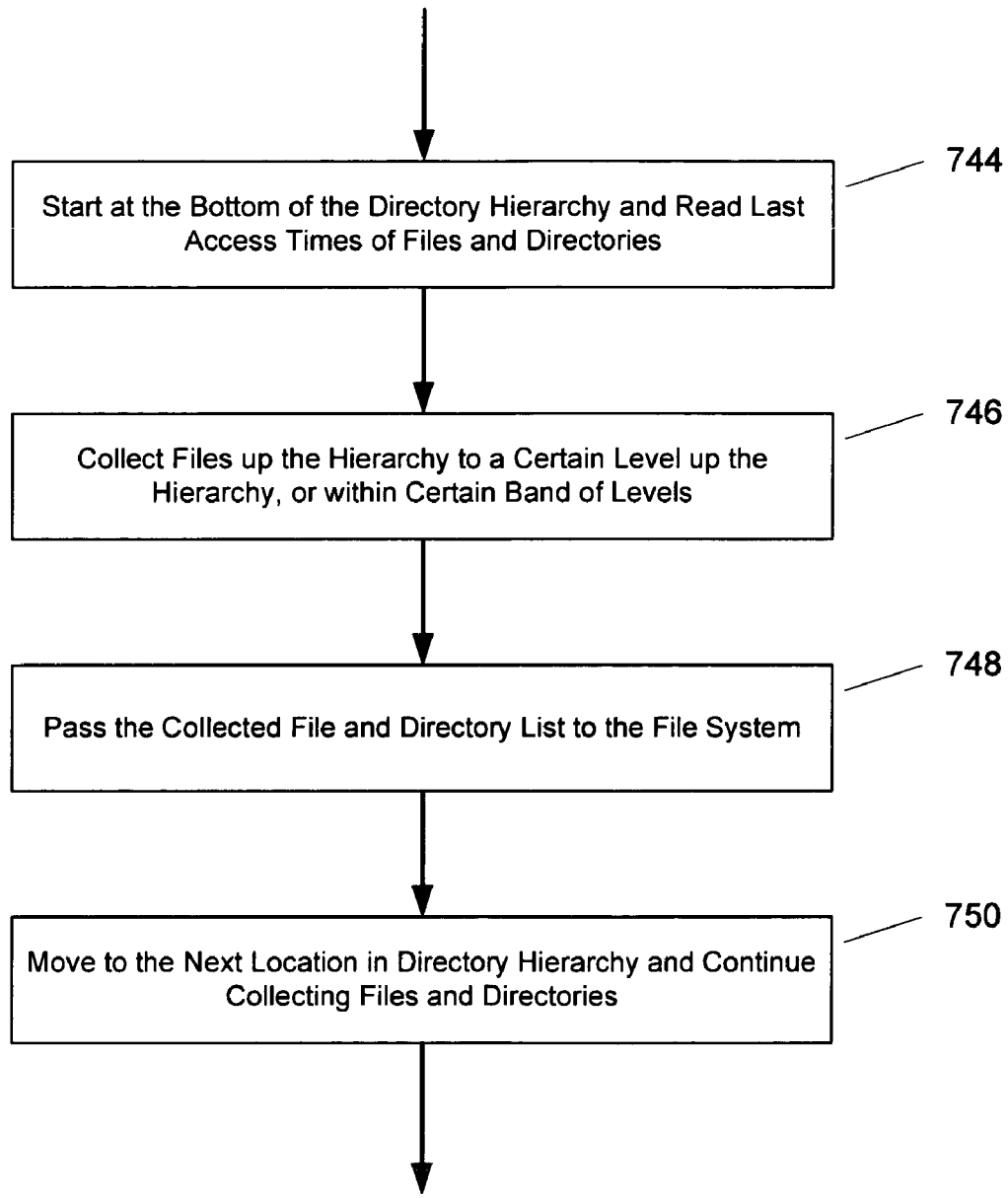
FIG. 11 is a flow chart illustrating various operations related to clustering in an embodiment of the present invention. The files and directories are traversed, in this exemplary embodiment, in some predetermined order.

Referring now to FIG. 11, a flow chart is shown illustrating various elements of application-side clustering in an embodiment of the present invention. The files and directories are traversed in some predetermined order in this example, such as depth-first or breadth-first traversals in the directory hierarchy. Or, the files and directories can be arranged based on various attributes, for example, as shown in FIG. 4A, and traversed in a certain predetermined order in this space. The exemplary method of FIG. 11 begins by reading the last file access times starting from a leaf node at a certain depth of the directory hierarchy, as indicated by block 744. Next, files and directories are collected, for example, based on certain proximity relationships among them, into a file list, as shown in block 746. This operation may also comprise, for example, "on-line" versions of more formal clustering similar to that illustrated with respect to FIG. 4B, in some embodiments. The list is then sent to the file system, at 748, and the process continues as indicated in block 750

Figure 12:
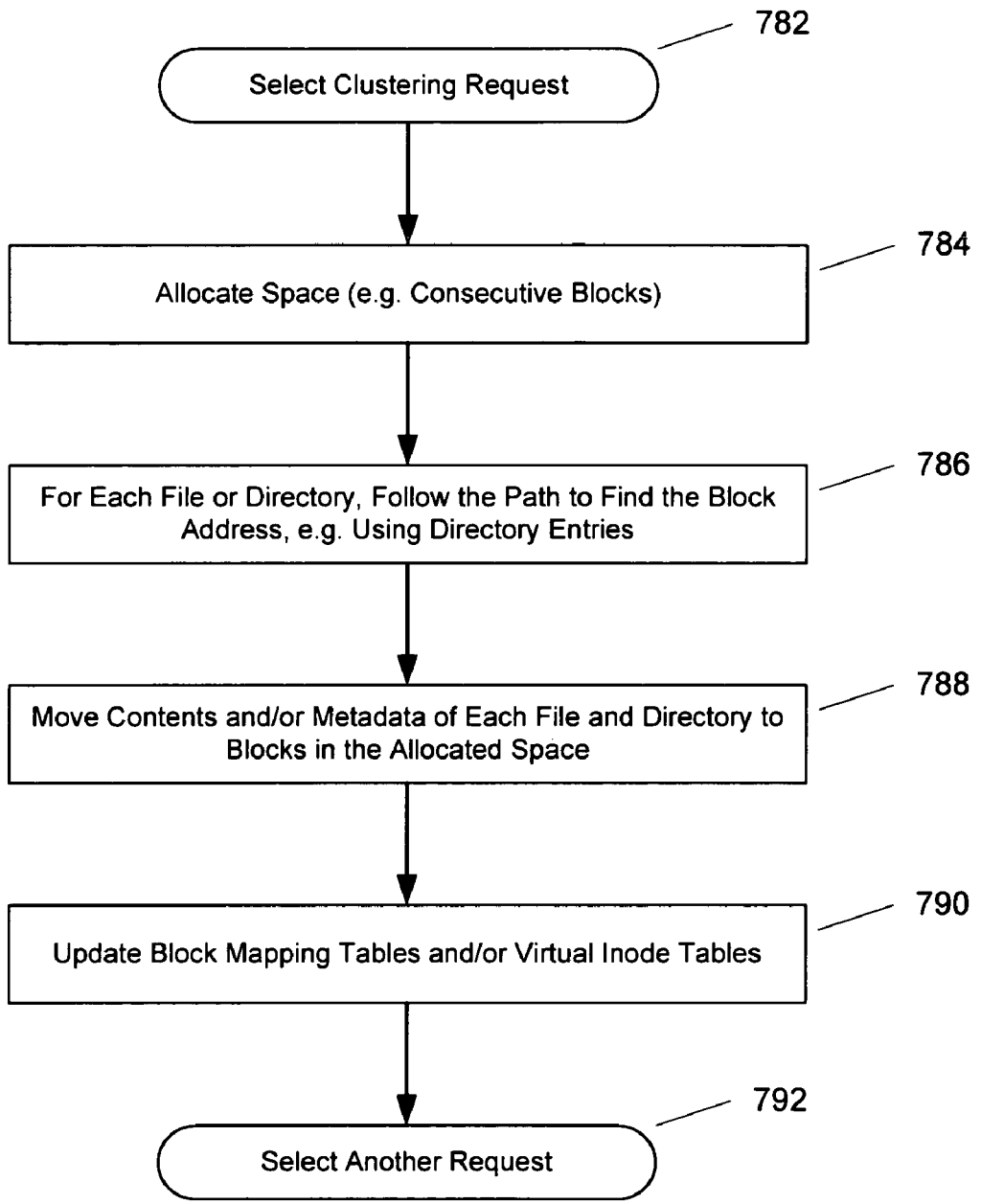
FIG. 12 is a flow chart illustrating various tasks done by the file system in response to clustering requests, according to an exemplary embodiment of the present invention.

FIG. 12 is a flow chart illustrating various exemplary tasks performed by a file system in response to clustering requests, according to an exemplary embodiment of the present invention. In this flow chart, it is assumed that the incoming requests have already been queued or otherwise stored, and the flow chart of the figure describes a portion where one selected request is being handled. Note that, in some embodiments, the request is considered a hint or a suggestion rather than a mandatory requirement. This exemplary process starts, at block 782, by selecting a particular request which comprises at least one list of files and directories to be clustered together. Based on the selected request, or more particularly, based on the lists of files in the request in some embodiments, various operations are performed, namely operations 784 though 790 as shown in FIG. 12. According to this exemplary embodiment, the file system first reads the file list and allocates space or consecutive array of blocks that can hold all or some of the files in the list, at block 784. Then, file content or its metadata are moved to this newly allocated blocks, as illustrated in blocks 786 and 788, and appropriate block mapping tables are updated, at 790, based on the new allocation of blocks. In many file system implementations, a block mapping table or its variation is used to keep track of blocks associated with file content or its metadata. In some embodiments of the present invention, additional tables, which we call virtual inode tables in this disclosure, may be used to keep track of inode allocations, in particular. This will be elaborated with reference to FIGS. 13-15. The exemplary process of FIG. 12 continues with other requests as indicated by block 792. It should be noted that even though many embodiments of the present invention are explained in the context of storage medium that is both readable and writable, they may be used for write-once media such as CD-Rs. In those cases, the permanent arrangement of files and directories will be a reflection of the clustering considerations.

At least one embodiment of the present invention utilizes aforementioned virtual inode tables. A virtual inode table maintains a mapping between inodes and the blocks storing the corresponding inodes in an indirect way. This allows the file system to rearrange physical inode blocks without affecting other programs, which rely on the constancy of the inode-block mapping.

Figure 13A:
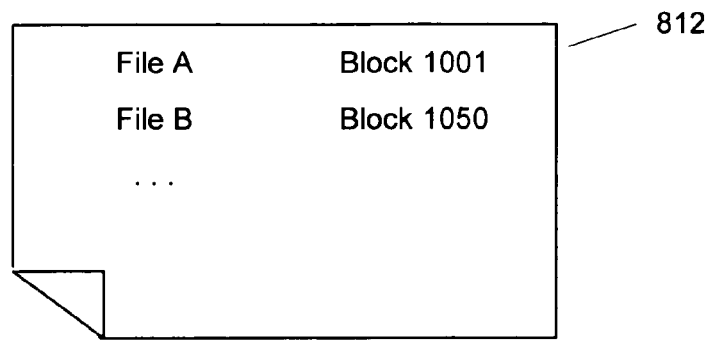
FIG. 13A shows a structure of a typical directory entry (dentry) in the prior art.
Figure 13B:
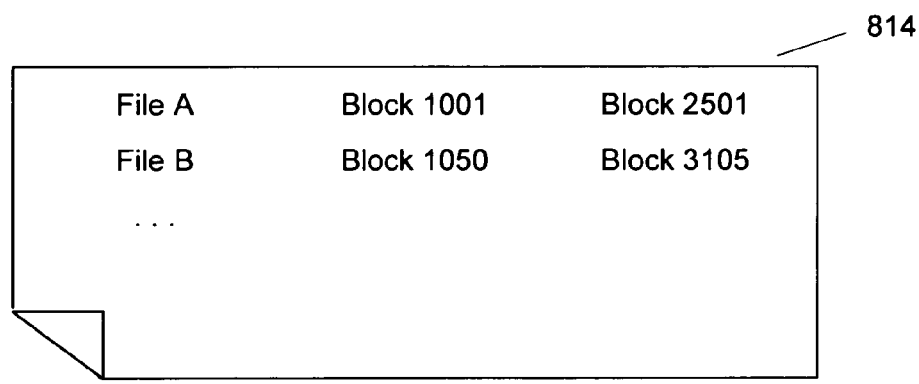
FIG. 13B shows a new dentry structure used in some embodiments of the present invention.
Figure 13C:
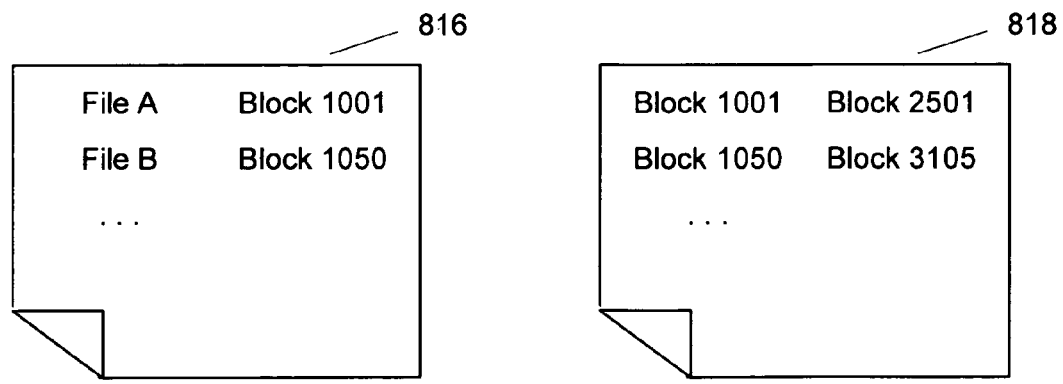
FIG. 13C shows another way of representing this indirection using two tables according to an embodiment of the present invention.

With respect now to FIG. 13, FIG. 13A shows a structure of a typical directory entry (dentry) 812 in a prior art, whereas FIG. 13B shows a new dentry structure 814 used in some embodiments of the present invention. The first column from each table shows files and directories contained in the directory that the table is associated with. The second column of the dentry 812 of FIG. 13A shows the block address of inode table for the corresponding file or directory, where file or directory metadata is stored. On the other hand, as illustrated in FIG. 13B, the new data structure 814 includes a level of indirection, as can be seen by three column format. The inode pointer, or virtual inode, shown on the second column in this example, points to the real inode, shown on the third column. FIG. 13C shows another way of representing this indirection using two tables, 816 and 818. In this example, the two tables are coupled by sharing virtual inodes, which is in the second column of the first table 816 and the first column of the second table 818.

Figure 14A:
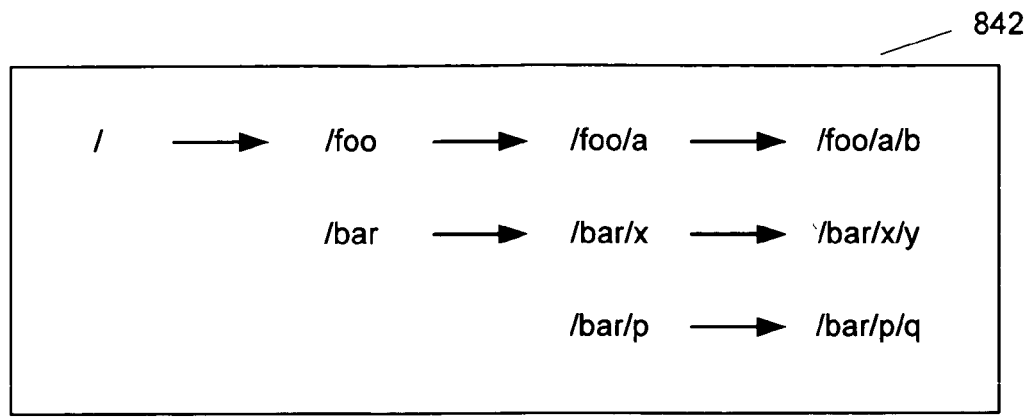
FIGS. 14A-14C illustrate new dentry structures using an example.
Figure 14B:
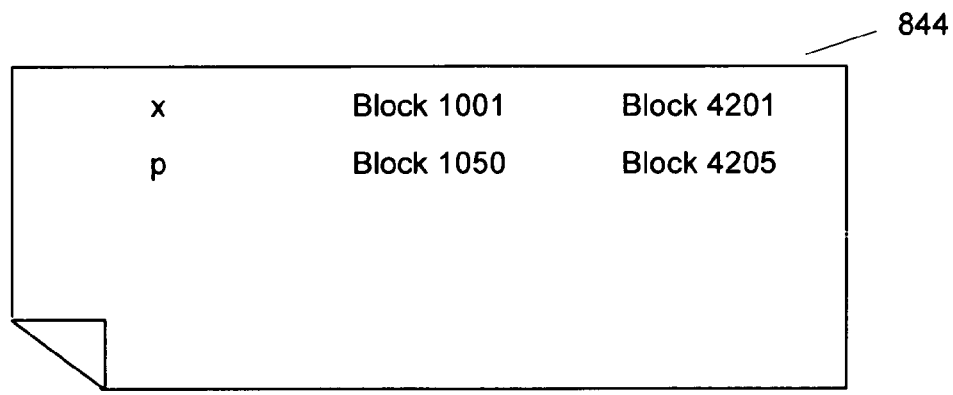
Figure 14C:
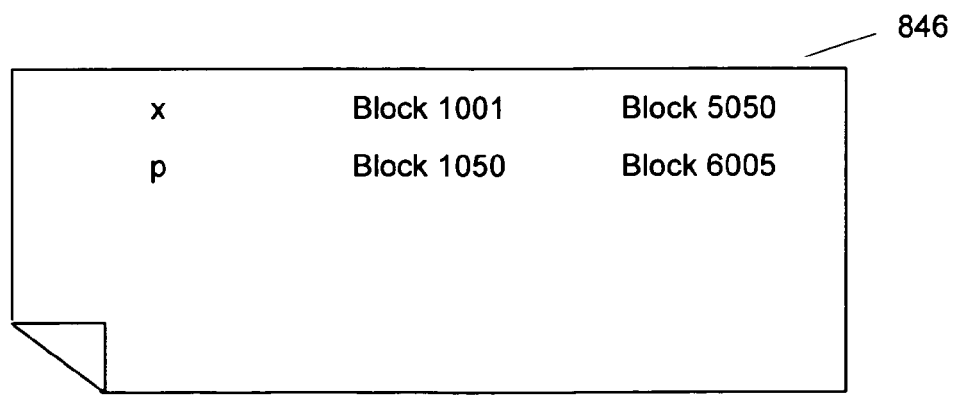

FIG. 14 illustrates an exemplary use of the new dentry structure shown in FIG. 13B. FIG. 14A shows an exemplary directory structure 842. This exemplary file system contains six directories and three files as shown in the figure. FIG. 14B shows a dentry 844 corresponding to the directory "/bar", in one particular arrangement of blocks in the file system. FIG. 14C shows a dentry 846 of the same directory in a different arrangement of blocks. As illustrated in FIGS. 14B and 14C, the real inode blocks can be rearranged without changing the inode pointers in the virtual inode table.

Figure 15:
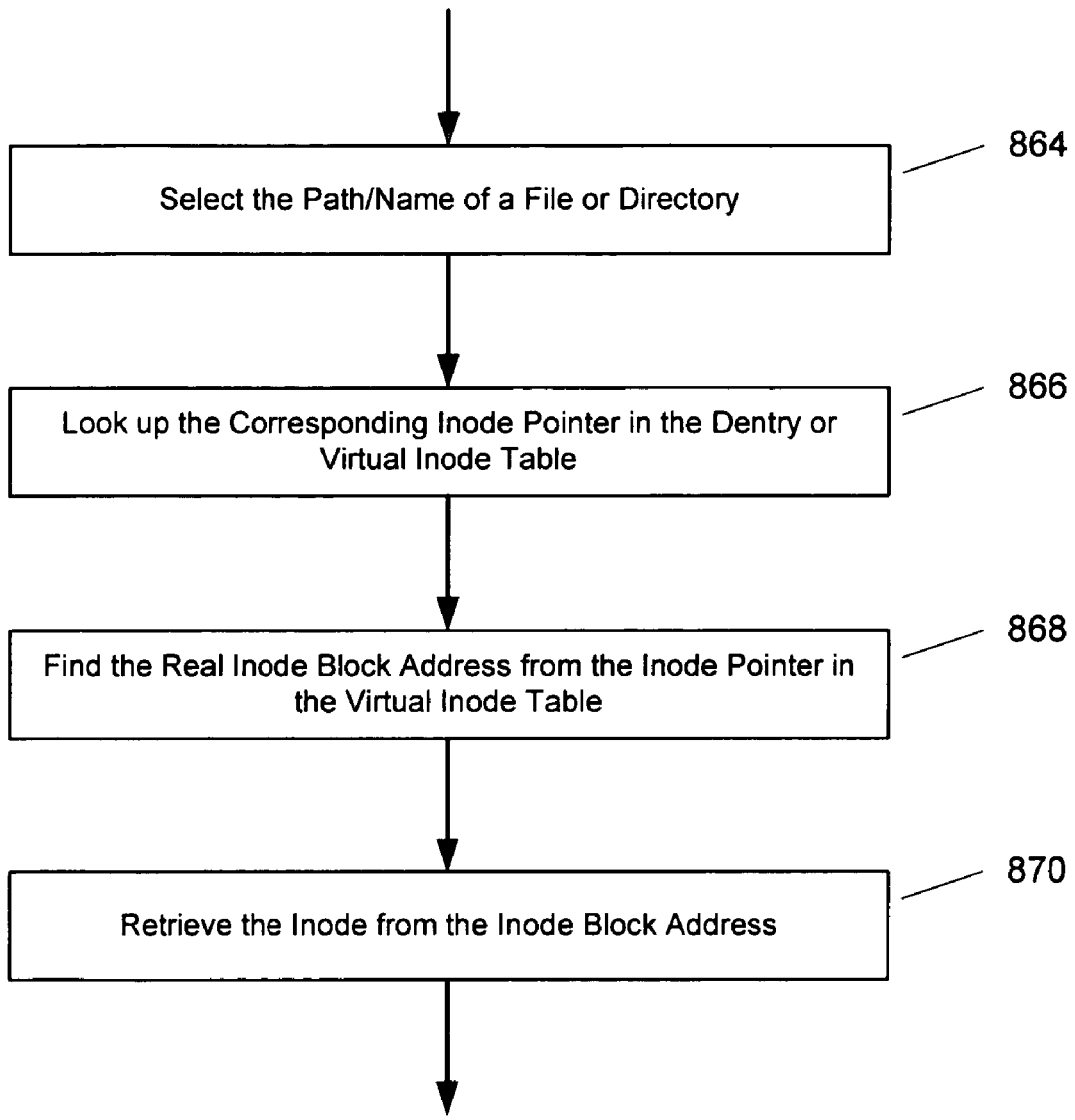
FIG. 15 is a flow chart illustrating an exemplary process using a virtual inode table according to an embodiment of the present invention.

FIG. 15 is a flow chart illustrating an exemplary process of looking up an inode using a dentry and/or virtual inode table according to an embodiment of the present invention. The process starts by receiving a name or path of a desired file or directory, as indicated by block 864. In a typical hierarchical file system, the path of a file or directory is traversed from the top, i.e., the root directory ("/"). The exemplary process shown in FIG. 15 can be viewed as operations involved in looking up a particular inode during this traversal. Once the name is given, the corresponding virtual inode pointer is read from appropriate tables such as dentry, at block 866. Then this inode pointer is used to retrieve the real inode block address, 868. Finally, the desired inode is read from the block at the given inode address, as indicated in block 870. In some file system implementations, certain inodes may be stored in more than one block. In such cases, the retrieved block address may contain further pointers to the blocks that contain the inode.

Figure 16A:
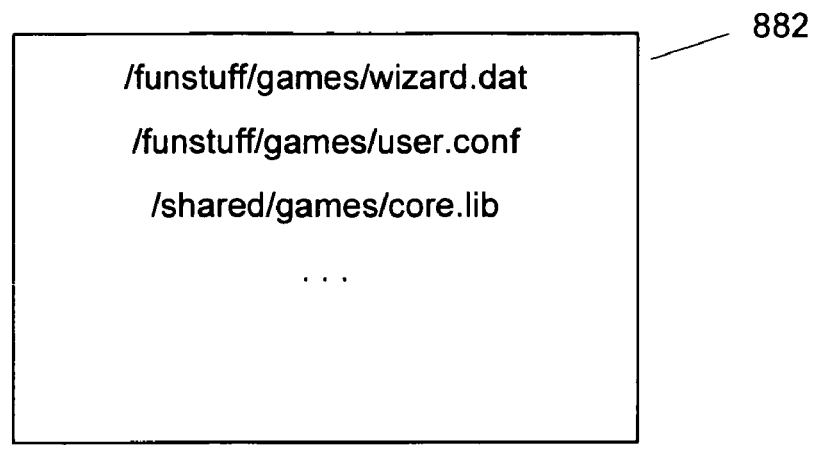
FIG. 16A shows a simple data type used for exchanging information between the first software component (e.g. an application program) and the second software component (e.g. a file system) as used in certain embodiments of the present invention.
Figure 16B:
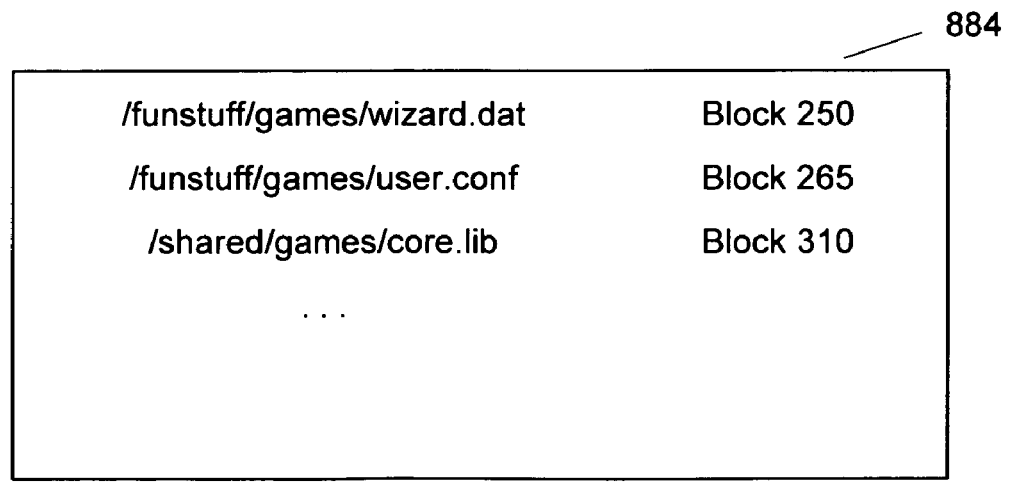
FIG. 16B illustrates another exemplary data structure, or a list, which contains additional information regarding the inode pointers according to certain embodiments.

FIG. 16 illustrates various data structures as used in certain embodiments of the present invention. FIG. 16A shows a simple data type 882, or a file list, used for exchanging information between the aforementioned first software component, e.g. an application or utility program, which generates file clustering requests based on certain predetermined clustering algorithms, and the second software component, e.g. a file system, which performs block clustering on a specified block storage medium or media based on the given requests. The data structure 884, or a list, of FIG. 16B, as used in certain embodiments of the present invention, contains additional information regarding the inode pointers, as indicated by the third column in the list. In the example of FIG. 16A, this inode information can be obtained by reading appropriate dentries.

As will be appreciated by one of skill in the art, the present invention may be embodied as a method, data processing system or program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program codes embodied in the medium. Any suitable storage medium may be utilized including hard disks, CD-ROMs, DVD-ROMs, optical storage devices, or magnetic storage devices. Thus the scope of the invention should be determined by the appended claims and their legal equivalents, and not by the examples given.

Figure 17:
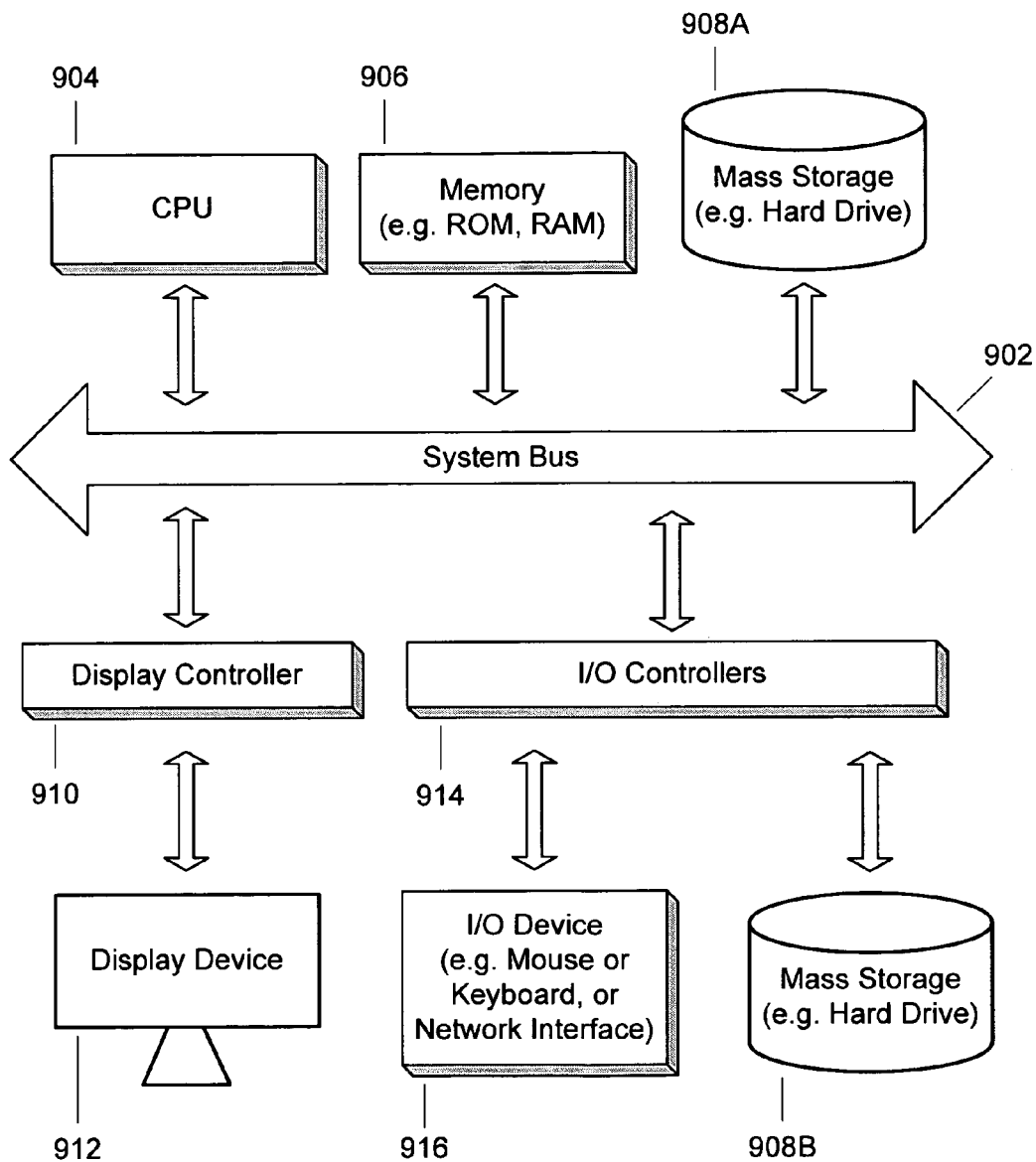
FIG. 17 illustrates a block diagram of an exemplary data processing system in an embodiment of the present invention.

FIG. 17 shows one example of a typical data processing system which may be used with embodiments of the present invention. Note that while FIG. 17 illustrates various components of a data processing system, it is not intended to represent any particular architecture or manner of interconnecting the components as such details are not germane to the present invention. It will also be appreciated that network computers and other data processing systems (such as cellular telephones, personal digital assistants, music players, etc.) which have fewer components or perhaps more components may also be used with the present invention. The computer system of FIG. 17 may, for example, be a Macintosh® computer from Apple Computer, Inc.

As shown in FIG. 17, the computer system, which is a form of a data processing system, includes a bus 902 which is coupled to a microprocessor(s) 904 and a memory 906 such as a ROM (read only memory) and a volatile RAM and a non-volatile storage device(s) 908A. The CPU 904 may be a G3 or G4 microprocessors from Motorola, Inc. or one or more G5 microprocessors from IBM. The system bus 902 interconnects these various components together and also interconnects these components 904, 906, and 908A to a display controller 912 and display devices 914 and to peripheral devices such as input/output (I/O) devices 916 which may be mice, keyboards, modems, network interfaces, printers and other devices which are well known in the art. Typically, the I/O devices 916 are coupled to the system through I/O controllers 914. The volatile RAM (random access memory) 906 is typically implemented as dynamic RAM (DRAM) which requires power continually in order to refresh or maintain the data in the memory. The mass storage 908A is typically a magnetic hard drive or a magnetic optical drive or an optical drive or a DVD ROM or other types of memory system which maintain data (e.g. large amounts of data) even after power is removed from the system. Typically, the mass storage 908A will also be a random access memory although this is not required. A block-type mass storage device comprises one or more block storage media. While FIG. 17 shows that the mass storage 908A is a local device coupled directly to the rest of the components in the data processing system, it will be appreciated that the present invention may utilize a non-volatile memory which is remote from the system, such as a network storage device which is coupled to the data processing system through a network interface 916 such as a modem or Ethernet interface. The bus 902 may include one or more buses connected to each other through various bridges, controllers and/or adapters as is well known in the art. In one embodiment, the I/O controller(s) 914 includes a USB (universal serial bus) adapter for controlling USB peripherals and an IEEE 1394 (i.e., "firewire") controller for IEEE 1394 compliant peripherals. Mass storage devices 908B may also be coupled to the system through I/O controllers 914. The display controllers 910 may include additional processors such as GPUs (graphical processing units) and they may control one or more display devices 912.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM or RAM 906, mass storage 908A and 908B or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software codes to simplify the description. However, those skilled in the art will recognize what is meant by such expressions is that the functions result from execution of the code by a processor, such as the CPU unit 904.

What is claimed:

1. A method performed on a computer system for managing a storage medium of the computer system storing a first plurality of files, each file having at least one attribute, said method comprising: a software component at an application level of the computer system generating data from said first plurality of files based on values of said at least one attribute, said data including a file list of a second plurality of files, said second plurality of files including a set of one or more files that are application files, a set of one or more files that are shared library files, and a set of one or more files that are system files; said software component communicating said data to a file system of the computer system at a kernel level; and performing, by said file system, at least one operation based on said data, said at least one operation comprising reallocating of data stored on the storage medium, the reallocating of data including: rearranging at least some of the second plurality of files such that only the set of files that are application files are stored in one or more first distinct contiguous regions of the storage medium, only the set of files that are shared library files are stored in a second distinct contiguous region of the storage medium, and only the set of files that are system files are stored in a third distinct contiguous region of the storage medium, such that seek time of the storage medium for accessing at least one of the application files, system files, and shared library files is reduced, and rearranging one or more real inodes on the storage medium without rearranging corresponding ones of one or more virtual inodes that point to the one or more real inodes respectively thereby maintaining constancy of inode-block mapping, wherein the one or more real inodes and virtual inodes are stored within the storage medium, and wherein the storage medium is a non-volatile storage medium.

2. The method of claim 1, wherein:
said at least one attribute comprises one of
(a) last file access time;
(b) file type;
(c) file access permission; and
(b) file location in a file hierarchy.

3. The method of claim 1, wherein:
said data includes a value of said at least one attribute for at least one file in said file list.

4. The method of claim 1, wherein:
said data includes proximity information, in terms of said at least one attribute, between first at least one file in said file list and second at least one file in said file list, wherein said first at least one file and said second at least one file are different.

5. The method of claim 1, wherein:
said generating is done so that said file list includes first at least one file and second at least one file, said first at least one file and said second at least one file being different, wherein said first at least one file and said second at least one file are substantially similar in terms of said at least one attribute.

6. The method of claim 1, wherein:
said generating is done in response to one of:
(a) user input; and
(b) system event.

7. The method of claim 1, wherein:
said file system has an API; and
said communicating comprises calling said API with said data.

8. The method of claim 1, wherein:
said storage medium comprises at least one physical block; and
said at least one operation comprises reallocation of said at least one physical block on said storage medium.

9. The method of claim 1, wherein:
said file system includes an array of at least one pseudo block.

10. The method of claim 9, wherein: said at least one pseudo block comprises one of
(a) a physical block of said storage medium;
(b) a logical block of said file system;
(c) a group of allocation blocks storing a file metadata; and
(d) a group of allocation blocks storing a file data content.

11. The method of claim 9, wherein:
said at least one operation comprises reallocating said at least one pseudo block in said array.

12. The method of claim 11, wherein:
said reallocating comprises moving said at least one pseudo block so that first at least one pseudo block corresponding to a first file from said file list and second at least one pseudo block corresponding to a second file from said file list are stored in substantially nearby locations in said array of pseudo blocks, wherein said first file and said second file are different.

13. A non-transitory machine readable medium containing executable computer program instructions which, when executed by a digital processing system, cause said system to perform a method for managing a storage medium storing a first plurality of files, each file having at least one attribute, the method comprising: a software component at an application level generating data from said first plurality of files based on values of said at least one attribute, said data including a file list of a second plurality of files, said second plurality of files including a set of one or more files that are application files, a set of one or more files that are shared library files, and a set of one or more files that are system files; said software component communicating said data to a file system at a kernel level; and performing, by said file system, at least one operation based on said data, said at least one operation comprising reallocating of data stored on the storage medium, the reallocating of data including: rearranging at least some of the second plurality of files such that only the set of files that are application files are stored in one or more first distinct contiguous regions of the storage medium, only the set of files that are shared library files are stored in a second distinct contiguous region of the storage medium, and only the set of files that are system files are stored in a third distinct contiguous region of the storage medium, such that seek time of the storage medium for accessing at least one of the application files, system files, and shared library files is reduced, and rearranging one or more real inodes on the storage medium without rearranging corresponding ones of one or more virtual inodes that point to the one or more real inodes respectively thereby maintaining constancy of inode-block mapping, wherein the one or more real inodes and virtual inodes are stored within the storage medium, and wherein the storage medium is a non-volatile storage medium.

14. The machine readable medium of claim 13, wherein:
said data includes a value of said at least one attribute for at least one file in said file list.

15. The machine readable medium of claim 13, wherein:
said generating is done so that said file list includes first at least one file and second at least one file, said first at least one file and said second at least one file being different, wherein said first at least one file and said second at least one file are substantially similar in terms of said at least one attribute.

16. The machine readable medium of claim 13, wherein:
said storage medium comprises at least one physical block; and
said at least one operation comprises reallocation of said at least one physical block on said storage medium.

17. A data processing system, the system comprising: a processor coupled to a display device; a mass storage device having a storage medium for storing a first plurality of files, each file having at least one attribute; and a memory coupled to said processor, said memory receiving instructions for: a software component at an application level generating data from said first plurality of files based on values of said at least one attribute, said data including a file list of a second plurality of files, said second plurality of files including a set of one or more files that are application files, a set of one or more files that are shared library files, and a set of one or more files that are system files; said software component communicating said data to a file system at a kernel level; and performing, by said file system, at least one operation based on said data, said at least one operation comprising reallocating of data stored on the mass storage device, the reallocating of data including: rearranging at least some of the second plurality of files such that only the set of files that are application files are stored in one or more first distinct contiguous regions of the storage medium, only the set of files that are shared library files are stored in a second distinct contiguous region of the storage medium, and only the set of files that are system files are stored in a third distinct contiguous region of the storage medium, such that seek time of the storage medium for accessing at least one of the application files, system files, and shared library files is reduced, and rearranging one or more real inodes on the storage medium without rearranging corresponding ones of one or more virtual inodes that point to the one or more real inodes respectively thereby maintaining constancy of inode-block mapping, wherein the one or more real inodes and virtual inodes are stored within the storage medium, and wherein the storage medium is a non\- volatile storage medium.

18. The data processing system of claim 17, wherein:
said data includes a value of said at least one attribute for at least one file in said file list.

19. The data processing system of claim 17, wherein:
said generating is done so that said file list includes first at least one file and second at least one file, said first at least one file and said second at least one file being different, wherein said first at least one file and said second at least one file are substantially similar in terms of said at least one attribute.

20. The data processing system of claim 17, wherein:
said mass storage device comprises at least one physical block; and
said at least one operation comprises reallocation of said at least one physical block on said mass storage device.

21. The data processing system of claim 17, wherein:
said file system includes an array of at least one pseudo block; and
said at least one operation comprises reallocating said at least one pseudo block in said array.

* * * * *

UNITED STATES PATENT AND TRADEMARK OFFICE
CERTIFICATE OF CORRECTION

| | | |
|---|---|---|
| PATENT NO. | : 7,930,508 B2 | Page 1 of 3 |
| APPLICATION NO. | : 11/370333 | |
| DATED | : April 19, 2011 | |
| INVENTOR(S) | : Dominic Giampaolo | |

It is certified that error appears in the above-identified patent and that said Letters Patent is hereby corrected as shown below:

In column 11, line 47, after "750" insert -- . --.

In column 14, lines 40-67 and in column 15, lines 1-4,
in Claim 1, delete "1. A method performed on a computer system for managing a storage medium of the computer system storing a first plurality of files, each file having at least one attribute, said method comprising: a software component at an application level of the computer system generating data from said first plurality of files based on values of said at least one attribute, said data including a file list of a second plurality of files, said second plurality of files including a set of one or more files that are application files, a set of one or more files that are shared library files, and a set of one or more files that are system files; said software component communicating said data to a file system of the computer system at a kernel level; and performing, by said file system, at least one operation based on said data, said at least one operation comprising reallocating of data stored on the storage medium, the reallocating of data including: rearranging at least some of the second plurality of files such that only the set of files that are application files are stored in one or more first distinct contiguous regions of the storage medium, only the set of files that are shared library files are stored in a second distinct contiguous region of the storage medium, and only the set of files that are system files are stored in a third distinct contiguous region of the storage medium, such that seek time of the storage medium for accessing at least one of the application files, system files, and shared library files is reduced, and rearranging one or more real inodes on the storage medium without rearranging corresponding ones of one or more virtual inodes that point to the one or more real inodes respectively thereby maintaining constancy of inode-block mapping, wherein the one or more real inodes and virtual inodes are stored within the storage medium, and wherein the storage medium is a non-volatile storage medium." and
      insert -- 1. A method performed on a computer system for managing a storage medium of the computer system storing a first plurality of files, each file having at least one attribute, said method comprising:
      a software component at an application level of the computer system generating data from said first plurality of files based on values of said at least one attribute, said data including a file list of a second plurality of files, said second plurality of files including a set of one or more files that are application files, a set of one or more files that are shared library files, and a set of one or more files Signed and Sealed this
Fourteenth Day of February, 2012

David J. Kappos
*Director of the United States Patent and Trademark Office*

CERTIFICATE OF CORRECTION (continued)
U.S. Pat. No. 7,930,508 B2 that are system files;

said software component communicating said data to a file system of the computer system at a kernel level; and performing, by said file system, at least one operation based on said data, said at least one operation comprising reallocating of data stored on the storage medium, the reallocating of data including:

rearranging at least some of the second plurality of files such that only the set of files that are application files are stored in one or more first distinct contiguous regions of the storage medium, only the set of files that are shared library files are stored in a second distinct contiguous region of the storage medium, and only the set of files that are system files are stored in a third distinct contiguous region of the storage medium, such that seek time of the storage medium for accessing at least one of the application files, system files, and shared library files is reduced, and rearranging one or more real inodes on the storage medium without rearranging corresponding ones of one or more virtual inodes that point to the one or more real inodes respectively thereby maintaining constancy of inode-block mapping, wherein the one or more real inodes and virtual inodes are stored within the storage medium, and wherein the storage medium is a non-volatile storage medium. --, therefor.

In column 15, line 10, in Claim 2, delete "(b)" and insert -- (d) --, therefor.

In column 16, lines 41 -67 and in column 17, lines 1-6, in Claim 17,
delete "17. A data processing system, the system comprising: a processor coupled to a display device; a mass storage device having a storage medium for storing a first plurality of files, each file having at least one attribute; and a memory coupled to said processor, said memory receiving instructions for: a software component at an application level generating data from said first plurality of files based on values of said at least one attribute, said data including a file list of a second plurality of files, said second plurality of files including a set of one or more files that are application files, a set of one or more files that are shared library files, and a set of one or more files that are system files; said software component communicating said data to a file system at a kernel level; and performing, by said file system, at least one operation based on said data, said at least one operation comprising reallocating of data stored on the mass storage device, the reallocating of data including: rearranging at least some of the second plurality of files such that only the set of files that are application files are stored in one or more first distinct contiguous regions of the storage medium, only the set of files that are shared library files are stored in a second distinct contiguous region of the storage medium, and only the set of files that are system files are stored in a third distinct contiguous region of the storage medium, such that seek time of the storage medium for accessing at least one of the application files, system files, and shared library files is reduced, and rearranging one or more real inodes on the storage medium without rearranging corresponding ones of one or more virtual inodes that point to the one or more real inodes respectively thereby maintaining constancy of inode-block mapping, wherein the one or more real inodes and virtual inodes are stored within the storage medium, and wherein the storage medium is a non\- volatile storage medium." and insert -- 17. A data processing system, the system comprising:

CERTIFICATE OF CORRECTION (continued)
U.S. Pat. No. 7,930,508 B2 a processor coupled to a display device;
a mass storage device having a storage medium for storing a first plurality of files, each file having at least one attribute; and
a memory coupled to said processor, said memory receiving instructions for:
a software component at an application level generating data from said first plurality of files based on values of said at least one attribute, said data including a file list of a second plurality of files, said second plurality of files including a set of one or more files that are application files, a set of one or more files that are shared library files, and a set of one or more files that are system files;
said software component communicating said data to a file system at a kernel level; and performing, by said file system, at least one operation based on said data, said at least one operation comprising reallocating of data stored on the mass storage device, the reallocating of data including:
rearranging at least some of the second plurality of files such that only the set of files that are application files are stored in one or more first distinct contiguous regions of the storage medium, only the set of files that are shared library files are stored in a second distinct contiguous region of the storage medium, and only the set of files that are system files are stored in a third distinct contiguous region of the storage medium, such that seek time of the storage medium for accessing at least one of the application files, system files, and shared library files is reduced, and rearranging one or more real inodes on the storage medium without rearranging corresponding ones of one or more virtual inodes that point to the one or more real inodes respectively thereby maintaining constancy of inode-block mapping, wherein the one or more real inodes and virtual inodes are stored within the storage medium, and wherein the storage medium is a non-volatile storage medium --, therefor.